United States Patent
Rossi et al.

(10) Patent No.: US 7,210,855 B2
(45) Date of Patent: May 1, 2007

(54) DEVICE FOR CONNECTING AN OPTICAL FIBRE

(75) Inventors: Giacomo Rossi, Milan (IT); Guido Oliveti, Milan (IT)

(73) Assignee: Pirelli & C. SpA, Milan (IT)

( * ) Notice: Subject to any disclaimer, the term of this patent is extended or adjusted under 35 U.S.C. 154(b) by 0 days.

(21) Appl. No.: 10/485,856

(22) PCT Filed: Aug. 6, 2002

(86) PCT No.: PCT/EP02/08794

§ 371 (c)(1),
(2), (4) Date: Sep. 7, 2004

(87) PCT Pub. No.: WO03/014791

PCT Pub. Date: Feb. 20, 2003

(65) Prior Publication Data

US 2005/0013547 A1    Jan. 20, 2005

Related U.S. Application Data

(60) Provisional application No. 60/310,244, filed on Aug. 7, 2001.

(30) Foreign Application Priority Data

Aug. 6, 2001  (EP) .................................. 01202961

(51) Int. Cl.
*G02B 6/36*      (2006.01)
(52) U.S. Cl. ......................................... 385/53; 385/75
(58) Field of Classification Search .................. 385/53, 385/55, 58
See application file for complete search history.

(56) References Cited

U.S. PATENT DOCUMENTS

| | | | |
|---|---|---|---|
| 4,218,113 A | 8/1980 | Uberbacher | |
| 4,756,591 A | 7/1988 | Fischer et al. | |
| 4,767,180 A | 8/1988 | Zajac et al. | |

(Continued)

FOREIGN PATENT DOCUMENTS

EP        0 546 936 A1    6/1993

(Continued)

OTHER PUBLICATIONS

Ariga Sadaichi; "Plug For Optical Connetor", Patent Abstracts of Japan, JP 61 126510, Jun. 14, 1986.

*Primary Examiner*—Frank G. Font
*Assistant Examiner*—Eric Wong
(74) *Attorney, Agent, or Firm*—Finnegan, Henderson, Farabow, Garrett & Dunner, L.L.P.

(57) ABSTRACT

A device for connecting an optical fibre has a connector associated with at least one optical fibre and can be inserted into a receptacle so as to realize an optical connection along an optical connection axis at an angle of 20° between the at least one optical fibre and at least one connection component housed in the receptacle. The connector has a main body for holding a first portion of an end part of at least one optical fibre and to let a second portion of the end part of the optical fibre project. A cover is slidably associated with the main body. The cover houses the second portion of the end part of optical fibre and leaves at least one bare end of the second portion of the end part completely uncovered.

23 Claims, 20 Drawing Sheets

U.S. PATENT DOCUMENTS

| | | |
|---|---|---|
| 4,787,706 A | 11/1988 | Cannon, Jr. et al. |
| 5,348,487 A | 9/1994 | Marazzi et al. |
| 5,732,174 A | 3/1998 | Carpenter et al. |
| 5,883,995 A * | 3/1999 | Lu ............................ 385/60 |
| 6,491,442 B1 * | 12/2002 | Murakami et al. ............ 385/58 |

FOREIGN PATENT DOCUMENTS

| | | |
|---|---|---|
| EP | 0 829 742 A1 | 3/1998 |
| FR | 2 586 304 | 2/1987 |
| WO | WO 97/23797 | 7/1997 |

* cited by examiner

SECTION A-A

SECTION B-B

DEVICE FOR CONNECTING AN OPTICAL FIBRE

CROSS REFERENCE TO RELATED APPLICATIONS

This application is a national phase application based on PCT/EP02/08794, filed Aug. 6, 2002, the content of which is incorporated herein by reference, and claims the benefit of European Application No. 01202961.7 filed Aug. 6, 2001 and the benefit of U.S. Provisional Application No. 60/310,244, filed on Aug. 7, 2001.

BACKGROUND OF THE INVENTION

1. Field of the Invention

The present invention relates to a device for connecting an optical fibre. More precisely, the invention relates to a connector for optical fibres and a device for connecting one or more optical fibres to a respective connection component. The invention also relates to a method for manufacturing a connector for an optical fibre, a method for terminating a fibre-optic cable, a fibre-optic communication line and a distribution network comprising at least two fibre-optic communication lines.

Throughout the present description and the subsequent claims the term "connection component" will be used to generally indicate an optical component, such as for example an optical fibre or a lens, or a opto-electronic components, such as for example an optical source (laser) or a photo-detector (or photo-receiver or photo-diode). For the sake of simplicity, henceforth reference will be explicitly made to the optical connection between optical fibre and opto-electronic component, i.e. a device which carries out an optical-electrical and/or an electrical-optical conversion, such as an optical source or a photo-detector, respectively; the same principles can, however, be applied to the case of a connection between two optical fibres, or between an optical fibre and a lens.

2. Description of the Related Art

Currently, in the field of telecommunications, optical technology is mainly used for long-distance transmission of optical signals using the known properties of wide band provided by optical fibres. On the contrary, for distributing signals to a plurality of users (such as, for example, television and/or analogue and/or digital telephone signals) and for transmitting digital data between electronic equipments (such as, for example, the Personal Computers of a LAN network) the technology which is mainly used makes use of electrical cables, such as, for example, coaxial or copper duplex cables.

Nevertheless, electrical cables have a relatively narrow band and they are becoming a bottleneck with respect to the band of signals to be transmitted. Moreover, they exhibit problems of electromagnetic interference, of impedance matching and they are difficult to be inserted into the appropriate raceways of a building since they are stiff. In addition, being bulky, they significantly reduce the number of cables which can be inserted into a raceway. Moreover, due to electrical safety requirements, they require the arrangement of separate raceways from those used for distributing electrical energy.

Thus the research is moving towards the possibility of using optics not just in the long-distance transmission of signals, but also in the signal distribution networks from a common branch point to a plurality of user apparatuses. Indeed, fibre-optic cables are suitable for being inserted into the appropriate raceways of a building since they are not too bulky, they are flexible, light, free from electromagnetic interference and they have low bending losses. In addition, they are suitable for being inserted into the same raceways which are used for distributing electrical energy. Moreover, optical fibres have a potentially very large band, low attenuation values and they are transparent to the bit rate, to the format and to the transmission code.

In addition, amongst the various types of optical fibres, single-mode optical fibres are preferable since they are much less sensitive to bending losses, they are per se less expensive, more robust, they have lower absorption losses, they are suitable for being used for a wavelength division multiplexing (or WDM) transmission and they have a wider band, making a signal distribution network easily expandable.

Nevertheless, for connection to electronic apparatuses, fibre-optic cables require the use of opto-electronic components to convert the electrical signals into corresponding optical signals and vice versa.

The conversion of an electrical signal into a corresponding optical signal is conventionally carried out by modulating the intensity of a light emitted by an optical source. The modulation is associated with the information transported by the electrical signal and the conversion of an optical signal into a corresponding electrical signal is conventionally carried out by means of a photo-detector.

The connection of an optical cable to an optical source and/or to a photo-detector is conventionally carried out by means of an optical connection device. Typically, an optical connection device is a device comprising two parts (henceforth referred to as connector and receptacle) which can be repeatedly connected to and disconnected from each other and which must be attached to one end of the optical cable and to the optical source or the photo-receiver, respectively.

In the specific case of mutual connection between two optical fibres, each of the two fibres is associated with a respective connector and the optical coupling is achieved by mutually connecting the two connectors by means of an intermediate connection element. Throughout the present description and the subsequent claims, the term "receptacle" is to be understood to also include such an intermediate element.

For example, an optical cable installation suitable for connecting, inside a building, a user apparatus to a central distribution apparatus (located, for example, in an office or in a flat and, respectively, in the cellar or in the loft), requires the implementation of the following steps: passing the optical cable along an appropriate raceway in the building; cutting the optical cable according to the desired length; clamping two connectors to the two ends of the cable, in the proximity of the user apparatus and of the central apparatus, respectively; optionally clamping the optical source and/or the photo-detector (if the optical source and the photo-detector are not already provided in appropriate receptacles) to two receptacles, in the proximity of the user apparatus and of the central apparatus, respectively; and, finally, connecting each optical connector with the respective receptacle for removably connecting the optical fibre with the source and/or the photo-detector, in the proximity of the central apparatus and of the user apparatus, respectively.

Nevertheless, conventional optical connection devices are disadvantageous to be used since an extremely precise alignment (in the range of micrometres) between optical fibre and optical source and/or photo-detector is required: such an alignment operation, apart from requiring a long execution time and being very difficult to carry out directly on site, must be carried out by highly specialised personnel, resulting therefore in high installation costs. Moreover, in order to achieve an extremely precise alignment, a highly precise fibre cutting operation must be carried out beforehand: such a cut must, indeed, be such as to define a free end of the fibre with a frontal face which is as flat and uniform as possible. To increase the precision of the optical alignment, such a face is typically also subjected to a lapping process using particular devices which are suitable for this purpose.

These aspects are even more relevant for single mode fibre-optic cables since a single mode optical fibre, having a core with a very small diameter (typically, 7–10 µm compared to that, for example, of 50–70 mm of a multimode glass optical fibre or to that larger than 100 µm of a multimode polymeric optical fibre) requires an alignment with the opto-electronic component with a precision in the order of one or few micrometres.

Throughout the present description and the subsequent claims we will often use the expression "portion of bare fibre". Such an expression is used to indicate a portion of optical fibre from which the acrilate coating layer has been removed so as expose the glass surface of the cladding.

Devices for realising a non-permanent optical connection between an optical fibre and an opto-electronic component (or another optical fibre) are known. The Applicant has studied such devices and has found a number of drawbacks.

WO 97/23797 discloses a device for connecting an optical fibre and an opto-electronic component or another optical fibre, comprising a connector associated with one end of a fibre-optic cable and a receptacle intended to receive said connector to realise the optical coupling between two optical fibres (or between the optical fibre and the opto-electronic component). The connector comprises an outer casing inside of which a fibre-holding device provided with a groove for housing the fibre is provided. The casing has an opening and a door for closing said opening: the door is intended to move when the connector is associated with the receptacle to allow the optical coupling between the fibre and the opto-electronic component or the other fibre be achieved. The receptacle comprises an alignment device intended to be inserted into the connector through the aforementioned opening to take in the free end of the bare fibre so as to realise the optical coupling. The alignment device comprises, in particular, a V-groove inclined with an angle of about 42° with respect to the longitudinal axis of the fibre of the connector. When the connector is completely inserted into the receptacle, the free end of the fibre is housed in the V-groove and is in contact with the face of the other fibre (or with the active surface of the opto-electronic component housed in the receptacle), thus realising the optical coupling. The device is designed in such a way that when the fibre of the connector comes into contact with the fibre of the receptacle (or with the active surface of the opto-electronic component housed in the receptacle), the fibre of the connector arches so as to define a radius of curvature less than 7.6 mm. Before carrying out such a coupling operation the bare fibre is lapped through a suitable device which is described and illustrated in the same application. Such a device has an opening for allowing the insertion of the connector; with the connector inserted, a lever pushes the bare fibre out from the outer casing of the connector in such a way that it can come into contact with a tape intended to realise the lapping process. The Applicant has noted that, in a device of the type described above, the fibre is subjected to high stresses due to the great angle of curvature (small radius of curvature) of the fibre itself when the connector is inserted into the receptacle; said stresses can be such as to cause the breaking of the fibre and in any case they reduce the reliability in operation (this is made worse by the fact that, since the connector is intended to be repeatedly inserted into and removed from the receptacle, the fibre is also subject to strain stresses). The Applicant has, moreover, observed that, with a device of the type described above, it is necessary to determine with particular attention the length of the bare fibre before carrying out the lapping process: indeed, the length must be such as to allow the contact of its end face with the lapping tape when the connector is inserted into the lapping device. It is, therefore, necessary, before carrying out the lapping process, to cut the bare fibre to a predetermined length according to the specific lapping instrument used.

U.S. Pat. No. 4,756,591 discloses a device for connecting an optical fibre and an opto-electronic component, comprising a support upon which a high precision V-groove is formed, said groove being intended to house a portion of the bare end of an optical fibre. The opto-electronic device is fastened onto the support at one end of the V-groove, with its active surface turned towards the groove. This groove is sized in such a way that, when the portion of bare end of the fibre is positioned therein, the face of the free end of such a portion of fibre is aligned with the active surface of the opto-electronic device. The optical coupling between optical fibre and opto-electronic device is carried out by positioning the end portion of the fibre in the groove and bringing the face of the free end of such a fibre portion into contact with the active surface of the opto-electronic device. The aforementioned end portion of the fibre is held in position into the groove by means of suitable fibre blocking elements arranged above the support and upon which a vertical elastic force acts; such elements are activated after having realised the optical coupling between fibre and opto-electronic device. The Applicant has observed that, with a device of the type described above, particular attention both to the sizing and manufacturing of the V-groove, and to the fastening of the opto-electronic device onto the support must be paid in order to achieve a very precise optical alignment between fibre and opto-electronic component; it is, therefore, necessary that the support is manufactured in a material suitable for allowing precise operations to be carried out (such as silicon treated through etching). Moreover, it is necessary to pay particular care to the positioning of the portion of bare fibre into the V-groove: such a portion of fibre, indeed, does not have the protective acrilate layer and is thus particularly exposed to possible knocks or contamination, which can cause damage and/or breaking of the fibre.

U.S. Pat. No. 4,767,180 discloses a device for connecting two optical fibres, each fibre being associated with a respective connector and being intended to be optically coupled with the other fibre in a suitable coupling bush. Each connector houses a fibre-holding element from which an end portion of bare fibre protrudes. Said portion passes through an appropriate perforated channel and arrives at the free end of the connector, as far as it protrudes out of the connector for a predetermined length. Each connector is intended to be housed in a respective seat provided in the coupling bush. Between the seats a guide element is interposed upon which a high precision V-groove is formed; said groove is intended to house and align the bare end portions of the two fibres when the two connectors are inserted into the respective seats. The optical coupling between the two fibres into the V-groove is realised by inserting the two connectors into the respective seats and making them mutually abut. The abutment surfaces of each connector are defined at the end of two extensions provided laterally with respect to the end portion of the fibre; each of these lateral extensions is intended to be inserted into a respective seat provided in the bush on a side of the V-groove. A locking element arranged above the bush, when activated, holds the two ends of fibre coupled in the V-groove. In such a device, the end portion of the fibre intended to be housed into the V-groove to realise the optical coupling always protrudes from the container for a predetermined length, also when the connector is not associated with the coupling bush. The Applicant has observed that, particularly during the connector maintenance operations and during the initial steps for connecting the connector to the bush, such a portion of bare fibre is particularly exposed to possible knocks or contamination, which can cause damage and/or breaking of the fibre.

U.S. Pat. No. 4,218,113 discloses a device for connecting two or more optical fibres, comprising a connector associated with one end of a fibre-optic cable so as to let a predetermined length of end portion of bare fibre project. The fibre is housed in the connector into an appropriate seat provided in a cylindrical support which can slide inside an outer protection cylinder. The connector is intended to be associated with a sleeve provided with a calibrated hole intended to receive the end portion of fibre which protrudes from the connector to realise the optical connection with another end portion of fibre also intended to be housed in the calibrated hole on the opposite side to the previous one. The hole has a diameter which is calibrated so as to realise the optical alignment between the fibres. The optical connection is realised by associating the connector with the sleeve: the sleeve has a cylindrical surface which protrudes out for a predetermined length and which, when penetrating into the connector's protection cylinder, pushes the support backwards (opposing the elastic force of a spring); the end portion of fibre is thus guided and housed into the sleeve's calibrated hole thus realising the optical coupling with the other fibre. In such a device the end portion of the fibre intended to be housed in the calibrated hole to realise the optical coupling protrudes from the connector for a short length which must be controlled with precision during the assembly of the cable to the connector. The Applicant has observed that this prevents the execution of precise cutting and possible lapping process; moreover, such operations require the use of an instrument which is suitable and specifically provided for such a connector.

U.S. Pat. No. 5,348,487 discloses a connector for optical fibres comprising, at one of its free ends, a foldaway lid intended, when the connector is not inserted into the receptacle, to close the end of the connector so as to protect the free end of the bare fibre housed inside of it. When the connector is inserted into the receptacle the cover is folded into open position so as to allow the full insertion of the connector into the receptacle and, thus, to realise the optical coupling. In such a device the fibre never protrudes from the connector and therefore is never fully exposed when the connector is not inserted into the receptacle. However, the Applicant has observed that when using such a device, the cutting, and possibly lapping, process of the fibre must be carried out before the fibre is associated with the connector: in such a case it is necessary to handle the bare fibre with extreme care in order to avoid damaging or breaking of the fibre.

U.S. Pat. No. 5,732,174 discloses a device for connecting two or more optical fibres. Each fibre is associated with a connector intended to be inserted into a receptacle. Each connector comprises an outer casing, a fibre protection cover slidably mounted inside the outer casing, a bush slidably mounted inside the protection cover and a fibre-holding device housed within the bush and integral therewith. The cover is mobile between a first work position (connector removed from the receptacle) wherein it houses the end portion of fibre intended to be optically coupled, and a second work position (connector inserted in the receptacle) wherein it completely uncovers an end part of such an end portion of fibre. The cover comprises a front surface provided with a calibrated hole having a diameter which is slightly larger than the diameter of the bare fibre (0.05 mm larger than the diameter of the fibre): during the insertion of the connector into the receptacle, the cover is pushed into the second operational position and the end part of the end portion of fibre projects from the cover through the aforementioned hole and positions itself in a precision V-groove provided in the receptacle, where the optical coupling with the other fibre takes place. In the connection operation, the hole in the cover guides the fibre towards said V-groove. The Applicant has observed that, in a device of the type described above, it is necessary to pay particular attention both at the sizing of such a hole (in order to ensure the function of guiding the fibre and, at the same time, to avoid damaging the bare fibre during the repeated movement of the cover from the first to the second operational position and vice versa), and at the assembly and maintenance of the connector (in order to realise a precise alignment between fibre and hole).

The Applicant has considered the problem of manufacturing a device for connecting an optical fibre wherein the fibre of the connector does not undergo high stresses and wherein the connector, still contributing to the realisation of a high precision optical alignment when inserted into an appropriate receptacle, is not expensive, structurally simple so as to be assembled directly on site, and at the same time such as to allow the risks of damage and/or breaking of the fibres during the maintenance operations and when working to be reduced.

SUMMARY OF THE INVENTION

The Applicant has overcome such a problem by manufacturing a connection device wherein the optical connection axis is inclined with respect to the direction of insertion of the connector into the receptacle at an angle less than 20° and wherein the connector has no precision seats or grooves and is equipped with a protection cover adapted to slide, without ever coming into contact with the bare fibre, between a first position, wherein the fibre is housed inside the cover, and a second position, wherein an end portion of bare fibre is completely uncovered and thus ready to be optically coupled.

Therefore, the present invention relates, in a first aspect thereof, to a device for connecting an optical fibre, comprising a connector adapted to be associated with at least one optical fibre and to be inserted into a receptacle along a predetermined insertion direction so as to realise an optical connection along an optical connection axis between said at least one optical fibre and at least one connection component housed into the receptacle, wherein said optical connection axis is inclined at an angle less than 20° with respect to said predetermined insertion direction and wherein the connector comprises:

a main body adapted to hold a first portion of an end part of at least one optical fibre and to let a second portion of said end part of optical fibre project;

a cover slidably associated with said main body and mobile between a first operational position, wherein said cover houses said second portion of the end part of optical fibre inside of it, and a second operational position, wherein said cover leaves at least one bare end portion of predetermined length of said second portion of the end part of optical fibre completely uncovered, said cover further comprising at least one opening for the passage of said second portion of the end part of optical fibre;

characterised in that said at least one opening in the cover of the connector is of a size which is much larger than the transversal size of said second portion of the end part of optical fibre, so as not to interfere with the fibre during the movement of the cover between said first and second operational positions.

Throughout the present description and the subsequent claims, the expression "completely uncovered" with reference to the end portion of the fibre is used to indicate a portion of fibre which is directly accessible from any direction.

The expression "much larger" used in the present description and in the subsequent claims, with reference to the transversal size of the opening provided in the cover, summarises the concept that the cover is of such a size as to never come into contact with the portion of bare fibre during the sliding of the cover.

In a first embodiment of the connector of the present invention, said at least one opening in the cover extends along all of the frontal surface of the cover (which, thus, does not have a wall at such a frontal surface). In the preferred embodiment, said at least one opening is provided on a portion of the frontal surface of the cover so as to ensure to the protruding fibre a greater protection with respect to the outside.

Such an opening can have any shape: rectangular, circular, slit-shaped, etc. Preferably, it is of a size which is no less than 1 mm; more preferably, when the opening is intended to cooperate with a ferule (as described below) such an opening has a substantially circular shape and has a diameter which is at least 10–15% larger than the outer diameter of the ferule.

Advantageously, the angle of inclination between the connector and the fibre aligning device of the receptacle, in the device of the present invention, is chosen in such a way that the fibre is not subjected to high mechanical stresses which, as well as involving the risk of breaking the fibre, reduce its reliability.

More advantageously, the main body of the connector of the present invention simply carries out a function of supporting and directing the fibre towards suitable seats provided in the receptacle, where, on the other hand, the high precision optical alignment and the optical coupling between fibre and opto-electronic element is achieved. The Applicant, thus, has thought to transfer the criticality of the optical alignment to the receptacle, leaving the connector with the sole function of supporting and directing the optical fibre. Since it is not necessary to realise high precision elements or components into the connector, it can thus be made with low-cost materials and technologies, such as that used in plastic moulding. Also the operations to be carried out to associate the cable with the connector are extremely simplified, with clear advantages in terms of cost and installation time and with the possibility of making the connection directly on site and without the need to turn to highly specialised personnel.

Advantageously, the presence of the slidable cover protects the bare fibre from possible knocks or contamination which can cause damage or breaking of such a fibre during the steps of connecting the connector to the distribution network. More advantageously, the provision in the cover of an opening being of a size which is much larger than the transversal size of the optical fibre allows to drastically reduce the risk of damaging and breaking the fibre both during the repeated movement of the cover between the first and the second operational positions, and during connector assembly and maintenance operations. Even more advantageously, the provision of a cover slidable outside of the main body of the connector substantially simplifies the execution of the bare fibre cutting operations; it is, indeed, sufficient to make the cover slide from the first to the second operational position to expose the bare fibre to be cut: such a cut can be carried out with a cutting device of the conventional type, i.e. it is not necessary to use devices specifically set up for the connector of the invention.

Preferably, said cover is mobile parallel to a longitudinal axis of said main body.

Preferably, said predetermined length of said at least one bare end portion of optical fibre is greater than or equal to 0.5 mm. This is considered to be an acceptable minimum value for achieving an extremely precise optical alignment between the fibre and the optical connection component housed into the receptacle.

Preferably, said predetermined length of said at least one bare end portion of optical fibre is shorter that 3 mm. Advantageously, the fibre is thus covered by the acrylate protective layer for almost the whole length thereof, thus reducing the possibility of damaging or breaking the fibre.

Preferably, the device of the present invention further comprises a lid associated with said cover and mobile between a first operational position, wherein said at least one opening is closed by said lid, and a second operational position, wherein said at least one opening is exposed to the outside, i.e. is not covered by said lid. More preferably, when said cover is in its first operational position said lid is in its first operational position and when said cover is in its second operational position said lid is in its second operational position, i.e. when the cover moves from its first operational position to its second operational positions the lid moves from its first operational position to its second operational position. This allows to avoid that the fibre accidentally knocks any object or is damaged or gets dirty or dusty when the cover is in its rest position (first operational position).

Preferably, the lid is made of an elastic material, e.g. steel, preferably stainless steel or carbon steel. More preferably, the lid has a first portion firmly associated to an upper face of the cover and a second portion associated to said first portion at a folding line thereof, wherein said second portion can be lifted from said first operational position up to said second operational position. The use of steel, such as stainless steel or carbon steel, as the material for the lid allows to provide for the required elasticity of the lid so that the lid, at rest, stands in its first operational position thanks to the elasticity of the material, while, in working position, the lid is lifted up to the second position thus allowing the opening to be exposed to the outside and the fibre to protrude through the opening.

Advantageously, the lifting of the lid from the first operational position up to the second operational position takes place automatically when the connector is inserted into the receptacle, i.e. without any automatic or manual driving device being needed. The receptacle thus preferably comprises an abutment element which contacts the lid during insertion of the connector into the receptacle and moves the lid up.

Preferably, the connector further comprises a blocking member which prevents movement of the cover from said first operational position to said second operational position when the connector is not inserted into the receptacle, thus reducing the risk to accidentally expose the fibre to the outside. Preferably, said blocking member comprises a projecting member associated with said lid, said projecting member being in abutment condition against the main body of the connector when the lid is in its first operational position, thus preventing the cover to slide with respect to the main body of the connector, and being moved over said main body when said lid is moved up to its second operational position, thus allowing the cover to slide with respect to the main body of the connector.

Preferably, said main body comprises at least one guide element for said second portion of the end part of optical fibre.

Preferably, the device of the invention comprises a spring interposed between said cover and said main body and adapted, in rest state, to keep said cover in said first operational position.

Preferably, said main body comprises:
  a base body provided with at least one first seat adapted to house said first portion of the end part of said at least one optical fibre and defining said at least one guide element;
  a first upper body adapted to be placed over and associated with said base body so as to define, at said first seat, a channel for housing said first portion of end part of said at least one optical fibre;
  at least one element for clamping at least one initial part of said first portion of the end part of optical fibre onto said base body.

Preferably, said channel for housing the fibre has a substantially rectilinear shape (parallel to the longitudinal axis of the main body). However, it can be advantageous, particularly in the case wherein the connector of the invention is intended to be associated with a dual-fibre or multi-fibre cable and the optical coupling requires that the individual fibres be positioned at a certain distance from each other, to realise fibre housing channels which are not rectilinear and, in particular, such that the respective inlet sections are close each other, so as to reduce to a minimum the mechanical stresses imparted upon the fibres during their positioning in the housing channels during assembly or maintenance of the connector.

Preferably, said first upper body is provided with at least one second seat (preferably with a mirror-like shape with respect to that of the first seat) intended to be placed over said at least one first seat to define said fibre housing channel.

Preferably, said at least one clamping element is made of a soft material such as a material chosen from the group comprising: rubber, silicon, etc. The use of one of the materials indicated above allows the fibre not to be damaged, while at the same time ensuring high friction with the fibre. Preferably, the chosen material is such that its chemical-physical properties remain unchanged over the time.

Alternatively, the clamping element can be an element obtained through moulding and provided with a surface having a corrugated or at least not flat profile so as to ensure a good friction with the fibre without also damaging it.

Preferably, said base body comprises at least one cavity formed upstream of said at least one first seat and intended to house said at least one clamping element. Advantageously, the optical fibre is thus clamped in the connector exclusively at said cavity and by means of the aforementioned clamping element.

Preferably, said base body further comprises a first aligning element intended to cooperate with a second alignment element provided in said first upper body in such a way as to guarantee the precise positioning of said first upper body on said base body. Even more preferably, said first alignment element comprises a recess and said second alignment element comprises a projection intended to be housed into said recess when said first upper body is positioned onto said base body. Alternatively the recess can be formed in the first upper body and the projection in the base body.

According to the present invention, said base body comprises an upstream portion (with respect to the housing portion of the bare optical fibre) provided with a first seat for housing a fibre-optic cable including said at least one optical fibre. Advantageously, said first seat comprises a plurality of teeth intended to grip the outer plastic sheath of the cable.

Preferably, said main body comprises a second upper body adapted to be associated with said base body at said upstream portion of the base body and provided with a second seat for housing a cable, said second seat being intended to cooperate with said first cable housing seat when said second upper body is positioned on said upstream portion of said base body, to hold in position, in a substantially stable manner, said cable for optical fibres. Advantageously, also said second seat comprises a plurality of teeth intended to grip the outer plastic sheath of the cable.

In a first embodiment of the connector of the present invention, said second upper body is pivoted to the upstream portion of the base body by means of a lateral hinge: in this way the operations for mounting the second upper body onto the base body are advantageously simplified.

In an alternative embodiment of the connector of the present invention, the fibre clamping element mentioned above is integral with the second upper body; also in this case, such an element is formed of a material capable of keeping its chemical-physical properties unchanged over the time and with a deformability such as to guarantee a high resistance to the longitudinal stresses of the fibre without also damaging it.

The connector of the present invention advantageously consists of four main parts: base body, first upper body, second upper body and cover. During the procedure of assembling the cable in the connector, only the second upper body must be mounted onto the base body of the main body; the first upper body and the cover are, on the other hand, associated with each other and with the base body of the main body directly by the manufacturer. The on-site assembly procedure thus reduces, advantageously, to the following steps:
  removing the outer sheath of the cable for a predetermined length of cable;
  removing (cutting or folding back) the reinforcement fibres (for example made of Kevlar™);
  removing a possible plastic protector tube from the fibre for an end part of fibre of a predetermined length;
  removing the outer acrilate coating of the fibre so as to obtain a part of bare fibre having a predetermined length;
  inserting said part of bare fibre having a predetermined length into the appropriate fibre housing channel defined by the base body and the first upper body;
  positioning the cable in the appropriate seat provided in the upstream portion of the base body of the main body;

optionally positioning the fibre clamping element in the appropriate cavity (in the case wherein such an element is not integral with the second upper body);

mounting the second upper body on the upstream portion of the base body so as to block the cable to the main body.

None of these operations require high precision; there is therefore a substantial advantage in terms of time and cost of installation.

Advantageously, said base body, first upper body, second upper body and cover are all made of a plastic material and through injection moulding; amorphous plastics, for example, can be used such as glass-reinforced polycarbonate (PC) with between 0 and 40% glass, or Acrylonitrile-Butadiene-Styrene (ABS), polyethylene (PE), polypropylene (PP), etc. reinforced with between 0 and 30% glass. The use of the plastic moulding technology for manufacturing the main body and the cover is advantageously made possible by the fact that high precision seats and openings for positioning, optically guiding and/or aligning the fibre do not need to be realised in the connector.

Even more advantageously, the material to be used for manufacturing the main body and the cover can be chosen so as to satisfy other possible particular requirement, such as that of being self-extinguishing.

Another important characteristic in the choice of the material with which the main body and the cover of the connector of the invention is manufactured is the dimensional stability and elasticity of such a material: this ensures the repeatability of the mechanical couplings between base body and upper bodies and between main body and cover. Advantageously, any plastic material can be used with a moulding shrinkage of less than 0.7%, preferably less than 0.5%, even more preferably less than 0.4%.

According to a preferred embodiment thereof, the connector of the present invention is sized in such a way as to allow its stable and precise housing in a cutting machine with sliding blades for cutting optical fibres (such as the cutter CT-07 of the company Fujikura which is often used by manufacturers and installers, or any other cutter compatible with this cutter), so as to realise a precise and clean cut (this is a very important characteristic for guaranteeing a high optical coupling efficiency) without having to subsequently employ lapping devices. This is particularly advantageous when the connector is associated with a dual-fibre optical cable or, more generally, with an optical cable comprising a number of substantially coplanar fibres: in such a way it is possible to cut the various fibres through a single cutting operation, thus obtaining fibres of the same length in an extremely short time, ensuring at the same time constant and repeatable cutting conditions.

Advantageously, the sizes and position of the fibres in the main body are thus defined according to the constraints of the conventional cutting machines; the main constraint is the minimum length of fibre which must protrude from the connector during the cutting step and which is then required to realise the optical coupling. The blade, in order to be able to cut through the fibres and to guarantee a cut which is perfectly perpendicular to the optical axis of the fibres, must be kept perpendicular to the plane where the fibres and the connector lie; the thickness of the blade and the sizes of the blade-guiding devices determine a minimum distance between the cutting section and the end of the connector. For these reasons the fibres must be uncovered for a predetermined length (for example, for the cutter CT-07 of the company Fujikura, a length of at least 10 mm), and thus the cover must be able to slide on the main body for a distance equal to at least said predetermined length. Advantageously, in order to increase the protection of the fibres when the cover is in its second operational position, the connector is structured in such a way that the cover, when brought to its second operational position, covers for a few mm the initial part of the end part of the optical fibres, and leaves the remaining end portion of such an end part completely uncovered: such an end portion projects from the main body and the cover to allow the optical coupling with the optoelectronic component.

However, conventional cutting machines are capable of cutting also those fibre having the acrilate protective layer thereon, i.e. whereas the length of the bare end portion of the fibre is very short, for example less than 3 mm.

In the case of dual-fibre and multi-fibre optical cables, it is of particular importance to obtain fibres of equal length since the length of the fibre determines the preloading level in the optical coupling between fibre and opto-electronic component: by realising fibres of equal length an equal preloading level for all the fibres in the cable is guaranteed. Such a preloading contributes to guaranteeing the permanence of the optical coupling between fibre and opto-electronic coupling. Indeed, according to the present invention, the length of the fibre is predetermined in such a way as to provide for an excess of fibre with respect to the length which is strictly necessary to realise the optical connection; such an excess of fibre causes the fibre to slightly arch when it comes into contact with the active surface of the opto-electronic component, thus generating a force which keeps the fibre pressed against such an active surface. Preferably, the excess of fibre is between 0.1 and 0.5 mm.

Preferably, said receptacle comprises:
a connector housing seat extended along said coupling direction;
a member for guiding said connector in said housing seat;
a device for releasably blocking said connector in said housing seat;
a device for aligning said at least one second portion of the end part of optical fibre with said at least one connection component along said optical connection axis.

Advantageously the optical alignment is thus realised in the receptacle by means of a suitable alignment device. Preferably, such an alignment device is manufactured by means of conventional low-cost technologies, as shown below.

Preferably, said housing seat comprises an abutment surface which is active on said cover when the connector is inserted into the receptacle so as to move said cover from said first operational position to said second operational position. Advantageously, the sliding of the cover thus takes place automatically when the connector is inserted into the receptacle, without any automatic or manual driving device being needed.

Preferably, said blocking device is elastically associated with said device for guiding the connector and comprises a tooth intended to be housed, when the connector is inserted into the receptacle, into a slot formed on said cover or into another appropriately formed seat or projection.

Preferably, said blocking device comprises a lever intended to control the unblocking of said connector from said blocking device in order to allow the removal of the connector from said housing seat. Advantageously, it is thus possible to realise an optical connection which is non-permanent and at the same time repeatable.

In a first preferred embodiment thereof, said alignment device comprises a base structure, said at least one connection component being integrally associated with said base structure and comprising at least one high precision groove extending parallel to said optical connection axis and intended to house, in a condition of optical alignment with said at least one connection component along said optical connection axis, said end portion of predetermined length of said second portion of the end part of optical fibre.

In a second preferred embodiment thereof, said alignment device comprises at least one ferule integrally associated with said connection component and provided with a calibrated hole extending parallel to said optical connection axis and adapted to receive said end portion of predetermined length of said second portion of the end part of optical fibre so that the fibre is substantially stable and in a condition of optical alignment with said connection component along said optical connection axis.

Advantageously, said at least one ferule is adapted to be partially housed into said at least one opening of the cover when the connector is inserted into the receptacle.

The alignment precision is therefore obtained thanks to the fact that the connection component (optical or opto-electronic component) is associated with the high precision groove or with the ferule so as to be optically aligned with that which will be the optical axis of the fibre when the fibre is housed into the groove or into the ferule's calibrated hole. The device of the invention is therefore advantageously designed so as to realise a condition of self-alignment of the fibre with the optical or opto-electronic component when the connector is inserted into the receptacle. Therefore, the operator who has to carry out the optical connection is not required to carry out any precision operation, with clear advantages in terms of installation time and cost.

In the embodiment of the device with the high precision groove, the precision of the optical alignment is achieved by providing in the base structure an insert formed in a material which allows the execution of micro-operations. Preferably, such a material is silicon. Advantageously, silicon allows a precision in the order of micrometres or more to be achieved and can be well integrated with optical, opto-electronic and electronic components.

In the embodiment with the ferule, the precision of the optical alignment is achieved by using conventional low-cost standard ferules with an internal diameter substantially equal to the diameter of the bare fibre.

Advantageously, since the use of both a precision silicon groove and a ferule with a calibrated hole is known in the optical communications sector, it is possible to make use of widely-produced low-cost devices.

Since both the precision silicon groove and the ferule allow to achieve an alignment precision even in the order of one micrometer, said optical fibre can advantageously be a single mode fibre.

This is a very advantageous aspect of the invention since, even though the single mode optical fibre has numerous advantages with respect to a multimode optical fibre (it is much less sensitive to bending loss, it is per se less expensive, more robust, it has lower absorption losses, it is suitable for being used for a wavelength division multiplexing—or WDM—transmission and has a wider band), its use in systems for the distribution of signals to a plurality of users has up to now been highly limited due to the high costs and long execution times required for its alignment with an optical or opto-electronic component. Such a problem is advantageously overcome by the device of the present invention since the optical alignment is achieved automatically (self-alignment) when the connector is inserted into the receptacle; in such a situation, indeed, the fibre is housed in the precision groove of the support structure in such a way as to be optically aligned with the optical or opto-electronic connection component.

Indeed, as is well known, a single mode optical fibre, having a core with a very small diameter (typically 7–10 µm, compared to 50–70 µm of a glass multimode optical fibre or more than 100 µm of a polymeric multimode optical fibre), requires an optical alignment with a precision in the order of one or a few micrometres. This is true particularly in the particular case of a single mode optical fibre and an optical source (typically a laser) since the optical source also typically is of a size in the order of a few micrometres and the light which travels through a single mode optical fibre has a different spot size from the light emitted by the optical source.

In the embodiment of the device with the high precision groove, such a groove is advantageously inclined at a predetermined angle (preferably of 1°–3°) with respect to said optical connection axis towards said connection component; this guarantees a perfect stability of the optical alignment between fibre and optical or opto-electronic component since the fibre is pressed against the precision groove.

Preferably, the device of the present invention further comprises, in the embodiment with the high precision groove, a fibre blocking member integrally associated with said blocking device and intended to cooperate with said base structure of the optical alignment device when the connector is inserted into the receptacle to hold, in a substantially stable manner, said end portion of predetermined length of said second portion of the end part of optical fibre in said at least one high precision groove. Advantageously, such a fibre blocking member activates automatically at the end of the insertion of the connector into the receptacle; in this way it is not necessary to actuate any mechanism to fasten the fibre in the high precision groove.

Preferably, said fibre blocking member comprises an element made of a soft material intended to come into contact, when the connector is inserted into the receptacle, with said end portion of predetermined length of said second portion of the end part of optical fibre housed in said at least one high precision groove. The use of a soft material, such as rubber or silicon allows the fibre not to be damaged, ensuring at the same time a high friction with the fibre.

Preferably, the device of the present invention is intended to be mounted in a flat; the receptacle is thus advantageously sized in such a way as to be housed in a conventional domestic electricity supply system. More preferably, the receptacle is intended to be housed in a container which is of the same standard size of the various electric fruits of a conventional domestic supply system. Advantageously, the receptacle is thus of standard size whereas the container can be of a different size according to the electric fruits. The container houses just the electronic components which are required for the operation of the opto-electronic component associated with the receptacle and a bus system which allows different fruits which are placed side by side to communicate with each other. In such a way it is possible to divide the electronic functions (conditioning of the signal, separation of the services, etc.) which are associated with different fruits, thus allowing a highly modular structure to be achieved.

In a second aspect thereof, the invention relates to a connector for optical fibres, comprising:
  a main body adapted to hold a first portion of an end part of at least one optical fibre and to let a second portion of said end part of optical fibre project;

a cover slidably associated with said main body and mobile between a first operational position, wherein said cover houses said second portion of the end part of optical fibre inside of it, and a second operational position, wherein said cover leaves at least one portion of a length greater than 3 mm of said second portion of the end part of optical fibre completely uncovered, said at least one portion of said second portion of the end part of the optical fibre being provided with a bare end portion, said cover further comprising at least one opening for the passage of said second portion of the end part of optical fibre;

an elastic element interposed between said main body and said cover and such as to keep, in rest state, said cover in said first operational position;

characterised in that said at least one opening is of a size which is much larger than the transversal size of said second portion of the end part of optical fibre, so as not to interfere with said fibre during the movement of the cover between said first and second operational positions.

As far as the structural and functional characteristics of said connector are concerned we refer to the description of above.

In a third aspect thereof, the invention relates to a method for manufacturing a connector for optical fibres, comprising the following steps:

providing a main body adapted to hold a first portion of an end part of at least one optical fibre and to let a second portion of said end part of optical fibre project;

providing a cover adapted to slide on said main body between a first operational position, wherein said cover houses said second portion of the end part of optical fibre inside of it, and a second operational position, wherein said cover leaves at least one portion of a length greater then 3 mm of said second portion of the end part of optical fibre completely uncovered, said at least one portion of said second portion of the end part of the optical fibre being provided with a bare end portion;

providing an elastic element between said main body and said cover, said elastic element being such as to keep, in rest state, said cover in said first operational position; characterised in comprising the step of providing in said cover at least one opening for the passage of fibre, said opening being of a size which is much larger than the transversal size of said second portion of the end part of optical fibre, so as not to interfere with the fibre during the movement of the cover between said first and second operational positions.

As far as the structural and functional characteristics of said connector are concerned we refer to that which has already been described above.

In a fourth aspect thereof, the invention relates to a method for terminating a fibre-optic cable comprising at least one optical fibre with a central portion made of glass material and an outer coating made of acrilate, said cable further comprising at least one plastic tube housing said at least one optical fibre, a plurality of longitudinal reinforcement fibres arranged around said at least one plastic tube and a plastic outer sheath, said method comprising the steps of:

providing at least one part of fibre of predetermined length by successively removing the plastic outer sheath, the longitudinal reinforcement fibres and said at least one plastic tube from a free end part of predetermined length of said cable;

inserting said at least one part of fibre of predetermined length into at least one fibre housing channel formed in a main body of a connector for optical fibres so as to house a first portion of said part of fibre of predetermined length in said housing channel and to let a second portion of said part of fibre of a predetermined length project, said connector for optical fibres further comprising a cover slidably associated with said main body and mobile between a first operational position, wherein said cover houses said second portion of the end part of optical fibre inside of it, and a second operational position, wherein said cover leaves at least one portion of a length greater than 3 mm of said second portion of the end part of optical fibre completely uncovered, said at least one portion of said second portion of the end part of the optical fibre being provided with a bare end portion, said cover comprising at least one opening for the passage of fibre, said opening being of a size which is much larger than the size of said second portion of the end part of optical fibre, so as not to interfere with the fibre during the movement of the cover between said first and second operational positions, said connector for optical fibres further comprising an elastic element operationally interposed between said main body and said cover, and such as to keep, in rest state, said cover in said first operational position;

positioning a part of the cable in an appropriate seat provided in the main body upstream of said fibre housing channel;

clamping said part of fibre of predetermined length with respect to said main body;

blocking said part of cable with respect to said main body;

moving said cover from said first to said second operational position so as to expose said end portion of predetermined length of said second portion of the end part of optical fibre;

cutting said end portion of predetermined length of said second portion of the bare end part of optical fibre at one of its cutting sections.

As far as the structural and functional characteristics of said connector are concerned we refer to that which has already been described above.

In a fifth aspect thereof, the invention relates to a communication line comprising at least one cable including at least one optical fibre, characterised in that said at least one cable is terminated at at least one of its free ends with a connector of the type described above.

As far as the structural and functional characteristics of said connector are concerned we refer to that which has already been described above.

In a sixth aspect thereof, the invention relates to a distribution network comprising at least two distribution lines of the type mentioned above and a branching unit associated with the two distribution lines.

BRIEF DESCRIPTION OF THE DRAWINGS

Further characteristics and advantages of the present invention will become clearer from the following detailed description of one of its preferred embodiments, made with reference to the attached drawings. In such drawings.

FIG. 18 is a schematic partial and side view of the structural elements of. FIGS. 11, 13 and 15 assembled with the connector of FIG. 1;

DETAILED DESCRIPTION OF THE INVENTION

Figure 1:
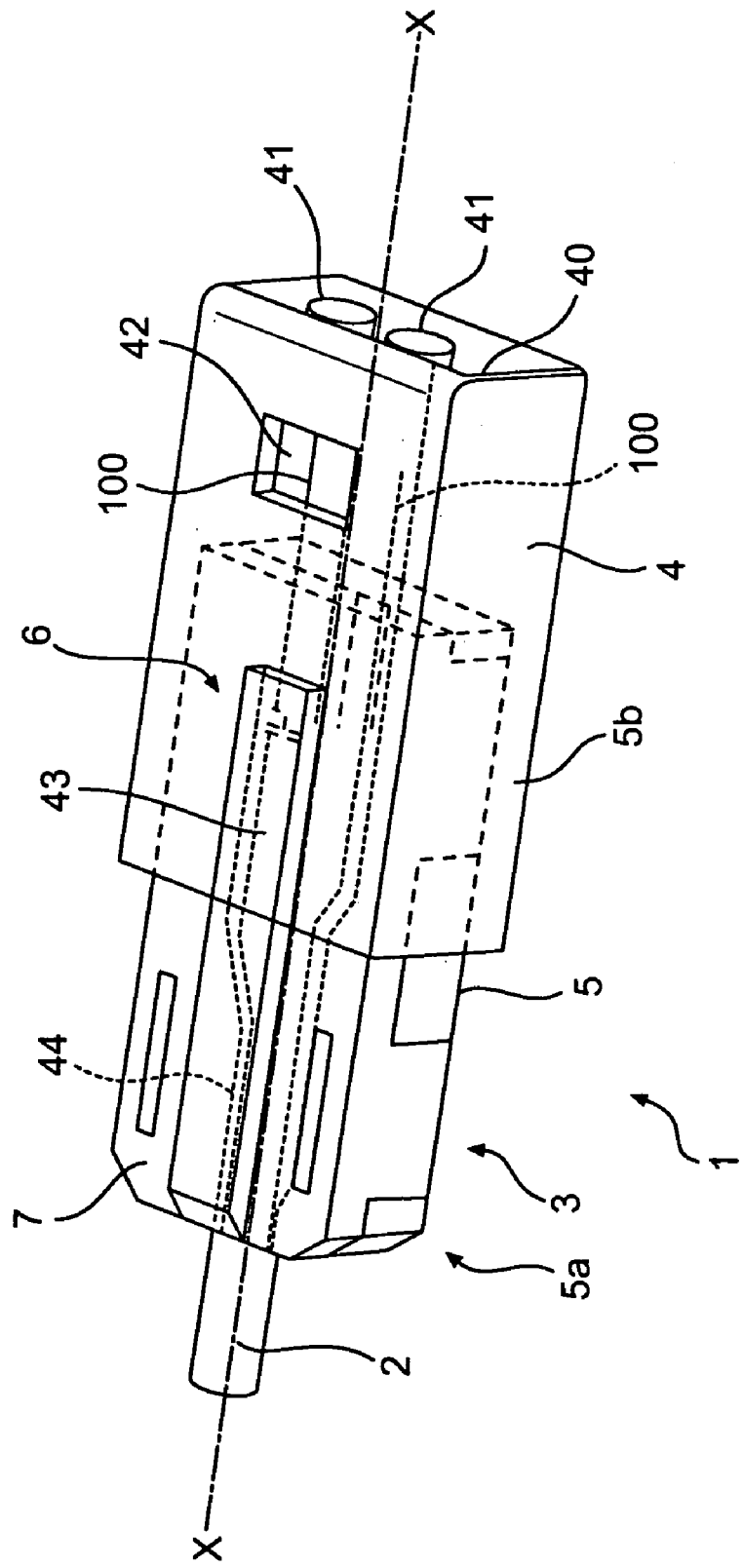
FIG. 1 is a schematic perspective view of a first embodiment of the connector according to the present invention.

In FIG. 1, with numeral reference 1 a connector for optical fibre according to the present invention is indicated. The connector 1 is associated with a fibre-optic cable 2 and basically comprises a main body 3 for housing and holding the cable 2, and a cover 4 slidably mounted on the main body 3 so as to be mobile, parallel to a longitudinal axis X—X of said main body, between a first and a second operational position which will be defined hereafter.

In the embodiment illustrated in the attached figures, the optical cable 2 is a dual-fibre cable comprising two optical fibres which are preferably single mode fibres, a plastic protection tube to cover both the fibres and a plastic outer sheath. Each optical fibre comprises a glass core, a glass cladding and an acrilate outer coating.

The optical cable 2 comprises, moreover, a plurality of longitudinal reinforcement fibres (not shown) which are flexible and resistant to traction. Such reinforcement fibres, advantageously made of Kevlar™, are arranged between the plastic tube and the plastic outer sheath.

For example, the optical cable 9 is of the type described in the patent application EP 0 829 742 filed by the Applicant.

The cable 2 has an end part from which the plastic outer sheath, the Kevlar™ fibres, the plastic tube which contains the two fibres and each fibre's layers of acrilate have been removed through conventional processes, so as to expose the glass surface of the cladding of the two optical fibres. The cable 2, therefore, in its operational configuration before being associated with the connector 1, comprises an end portion provided with a pair of bare end parts 100 of optical fibres.

Figure 2:
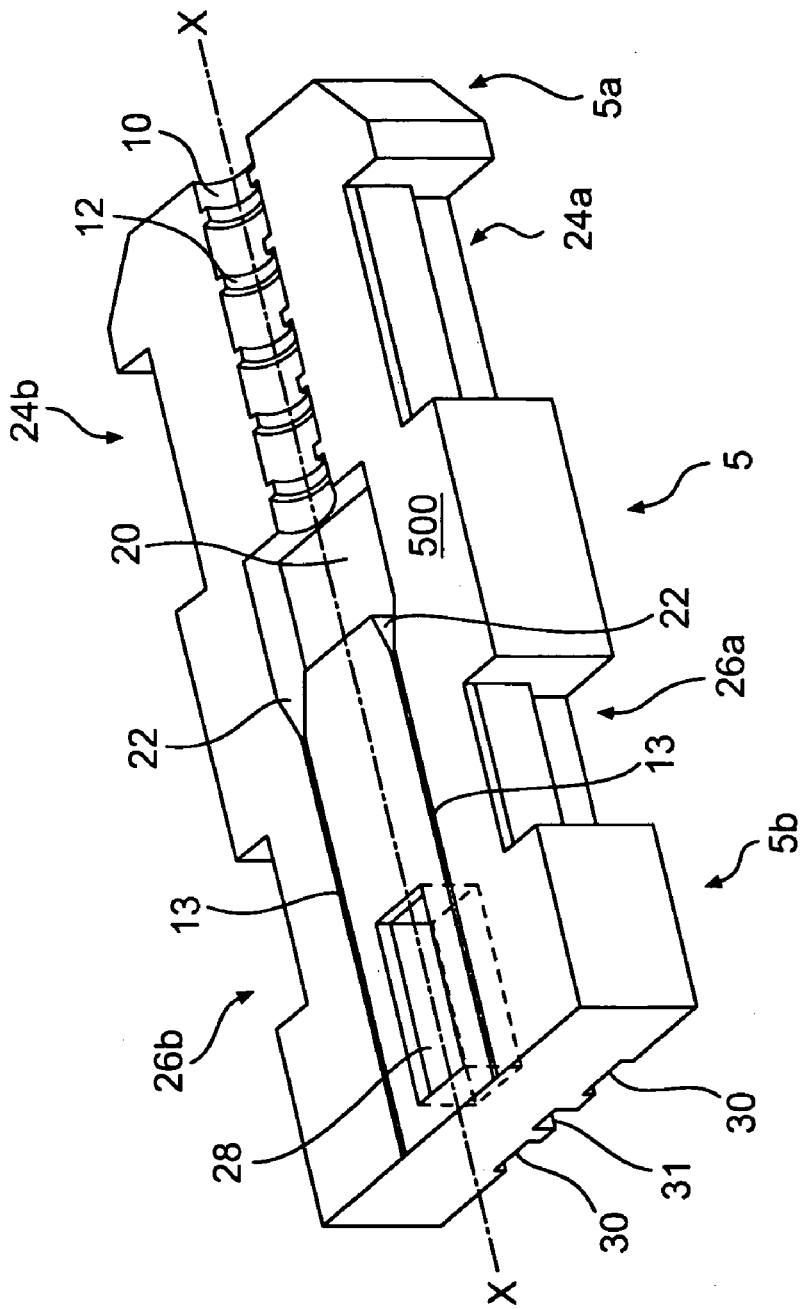
FIG. 2 is a schematic perspective view of a first structural element of the connector of FIG. 1.

As illustrated in FIG. 2, the main body 3 comprises a base body 5 wherein an upstream portion 5a for housing the cable and a downstream portion 5b for housing the bare end parts 100 of the optical fibres are defined.

Figure 3:
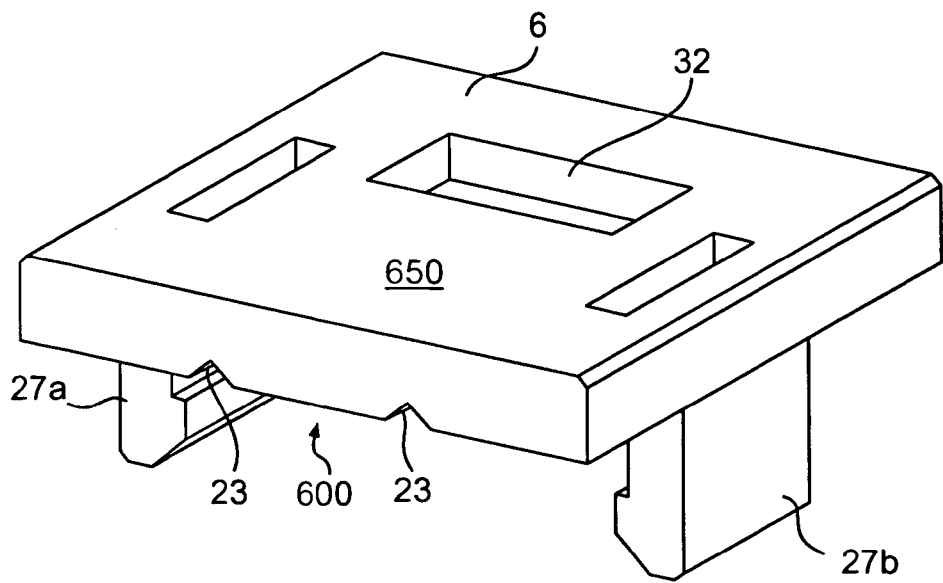
FIG. 3 is a schematic perspective view from above of a second structural element of the connector of FIG. 1, such an element being intended to cooperate with the structural element of FIG. 2.
Figure 5:
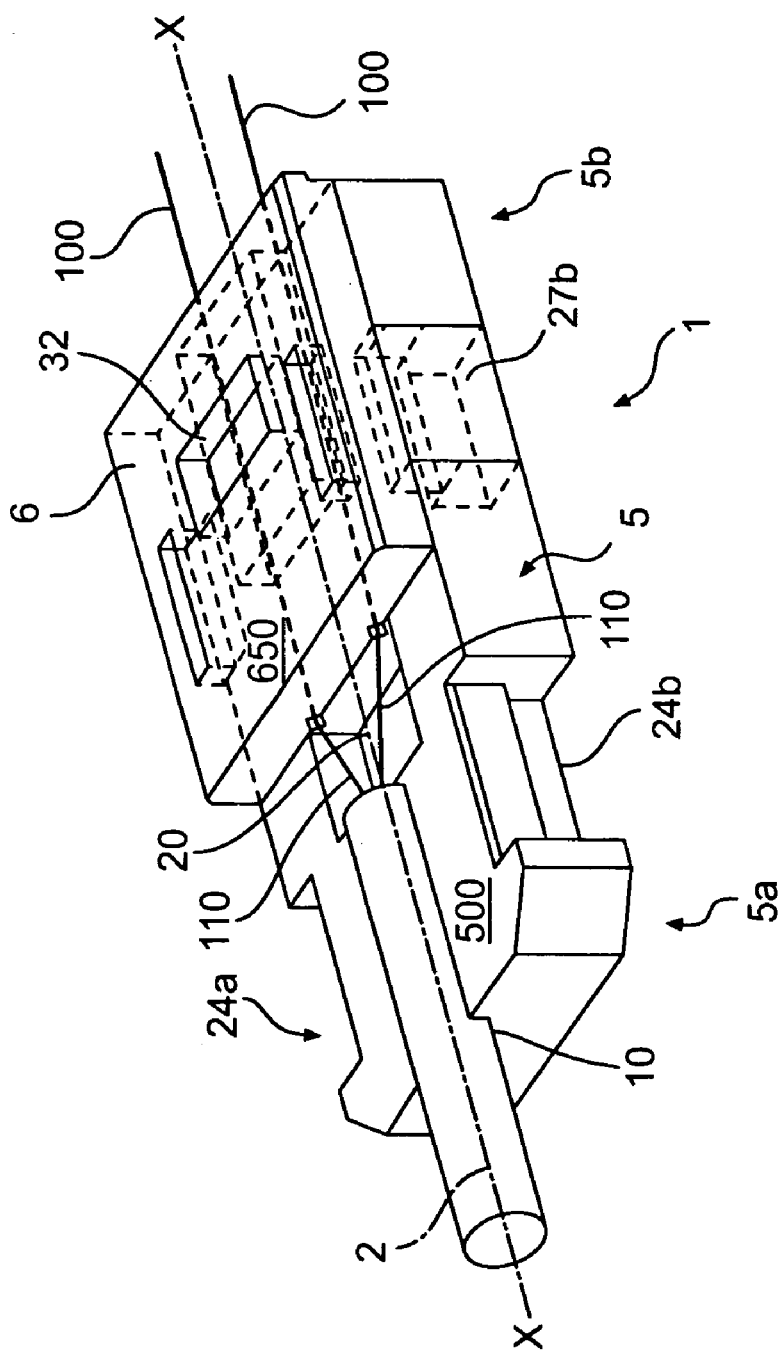
FIG. 5 is a schematic perspective view of the structural elements of FIG. 1 and 2 or 3 assembled.
Figure 6:
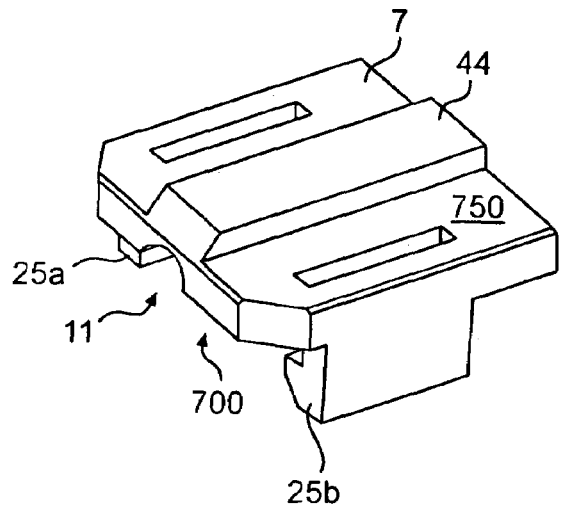
FIG. 6 is a schematic perspective view from above of a third structural element of the connector of FIG. 1, such an element being intended to cooperate with the structural element of FIG. 2.
Figure 7:
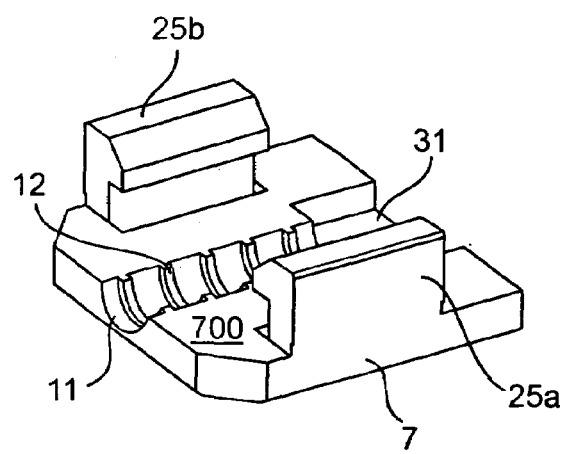
FIG. 7 is a schematic perspective view from below of the structural element of FIG. 6.
Figure 8:
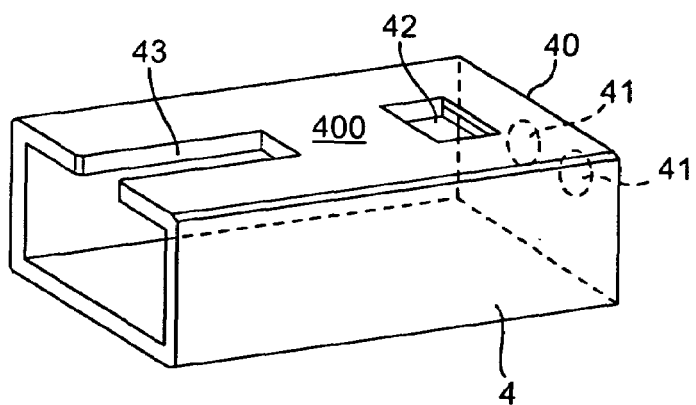
FIG. 8 is a schematic perspective view of a fourth structural element of the connector of FIG. 1.

The main body comprises, moreover, a first upper body 6 (see FIGS. 3 and 4) and a second upper body 7 (see FIGS. 6 and 7). The first upper body 6 is adapted to be snap-fitted onto the base body 5 at the downstream portion 5b of said base body (see FIG. 5); the second upper body 7 is adapted to be snap-fitted onto the base body 5 at the upstream portion 5a of said base body (see FIG. 1). The second upper body 7 can advantageously be pivoted to the upstream portion 5a of the base body 5 through a lateral hinge in order to simplify the assembly operations of said second upper body onto the base body.

On an upper face 500 of the base body 5, at the upstream portion 5a, and on an opposite lower face of the second upper body 7, respective longitudinal recesses 10 and 11 are formed; said recesses are suitable for cooperating when the second upper body 7 is associated with the base body 5, so as to define a seat for housing the cable 2. In the recesses 10 and 11 are formed a plurality of teeth 12 intended to grip the plastic outer sheath of the cable 2 to firmly attach it to the main body 3.

On the upper face 500 of the base body 5 (FIG. 2), at the downstream portion 5b, a pair of substantially parallel seats or grooves 13 (preferably V-grooves) are formed: said groove are suitable for cooperating, when the first upper body 6 is associated with the base body 5, with a respective pair of seats or grooves (also substantially parallel and preferably V-grooves) formed on a corresponding lower face

600 of the first upper body 6 (FIG. 4), so as to define a pair of channels for housing and guiding an initial portion of the bare end parts 100 of the optical fibres.

The grooves 13 and 14 are substantially rectilinear and extend parallel to the longitudinal axis X—X of the connector 1: they are of a size such as to house and guide the bare optical fibre in the housing channel defined by them. For example, for a bare fibre with an outer diameter of about 125 μm, the grooves 13 and 14 preferably have a depth equal to 0.09±0.05 mm and a half-width equal to 0.1±0.05 mm. The size of the grooves can however be different and such, for example, as to also contain a portion of fibre coated with the acrilate coating. Alternatively, it is possible to provide the grooves just in the base body (i.e. without also providing them on the first upper body): in such a case they will have a depth such as to completely house the bare optical fibres (and possibly also a portion of the fibres coated with the acrilate coating).

Figure 4:
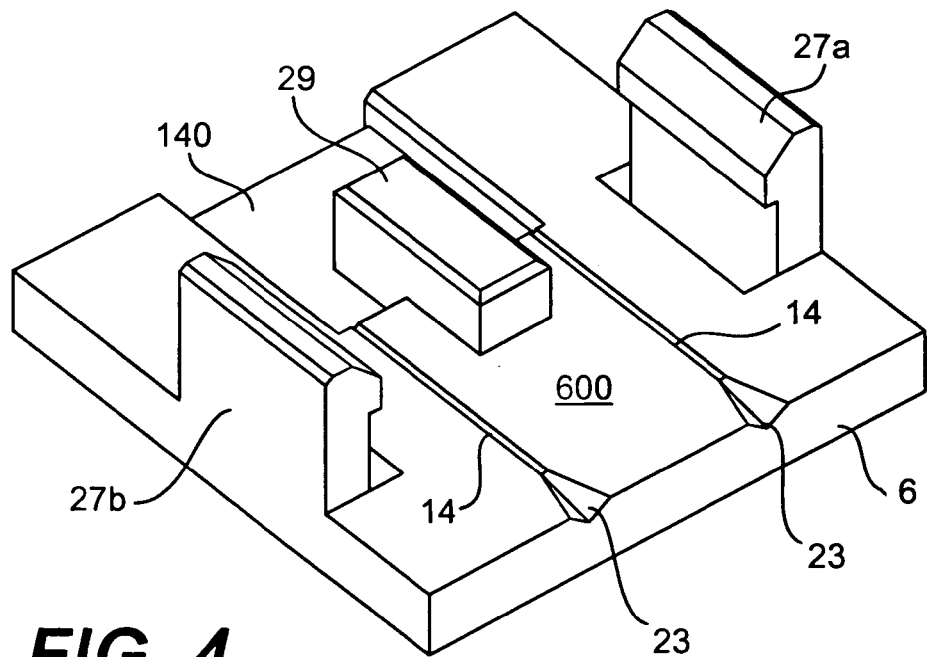
FIG. 4 is a schematic perspective view from below of the structural element of FIG. 2.

Advantageously, the first upper body 6 has a recess 140 formed on the face 600 downstream of the grooves 14 (FIG. 4). Such a recess has a depth greater than that of the grooves 14 so as to allow the fibres housed in the grooves 14 to flex when they come into contact with the active surface of the opto-electronic component (as better described hereafter). Alternatively, such a recess can be formed on the downstream portion 5b of the base body 5 of the container 1 downstream of the grooves 13; according to a further embodiment, such a recess can be formed both on the first upper body 6 and on the base body 5.

In one example, the grooves 13, extend longitudinally for about 14 mm, the grooves 14 for about 8 mm and the recess 140 for about 6 mm. The fibre projects from the main body 3 for at least 4 mm, preferably for about 11–12 mm, and is arranged at about 5 mm from a hypothetical supporting plane of the connector 1 when assembled (i.e. with the cover 4 mounted on the main body 3).

The recess 140 however is not necessary to be formed if the length of the part of fibre which projects from the main body 3 is such as to allow a sufficient portion of free fibre to flex during the connection operation. The length of the recess 140 can however be different depending upon the length of the part of fibre which is provided to be flexed inside the main body 3 after connection.

The cable 2, in its operational configuration illustrated in FIG. 1, i.e. after having been associated with the connector 1, thus has:

- a part provided with the plastic outer sheath housed into the seat of the main body 3 defined by the recesses 10 and 11 formed in the downstream portion 5a of the base body 5 and in the second upper body 7, respectively (see FIG. 1);
- an end part with a pair of bare fibres, wherein each bare fibre has:
  - a first portion of bare fibre housed in one of the fibre housing channels defined by the grooves formed in the downstream portion 5b of the base body and in the first upper body 6, respectively, and
  - a second portion of bare fibre which projects from the main body 3 (see FIG. 5).

On the face 500 of the base body 5, between the recess 10 and the grooves 13, a cavity is formed, said cavity being suitable for housing an initial part 110 of the bare end portions 100 of the optical fibres which, coming out of the recess 10, are directed towards the grooves 13. A corresponding cavity 21 is formed on the face 700 of the second upper body 7, between the recess 11 and the grooves 14. The cavities 20 and 21, when superimposed, define a zone adapted to house a clamping element (not shown) suitable for blocking said initial parts 110 of the bare end portions 100 of the optical fibres on said base body 5. Preferably, said clamping element comprises a pair of elements (for example rubber bulbs) adapted to be housed in the cavities 20 and 21, respectively; when superimposed, such elements sandwich the parts 110 of the bare end portions 100 of the optical fibres so as to ensure a good friction with the glass surfaces of the bare fibres, without damaging them, however. Such elements are preferably made of a soft material, such as a material chosen from the group comprising: rubber, silicon, etc., so as not to damage the bare fibre, ensuring at the same time a high friction with the fibre. Preferably, the material chosen is such that it keeps its chemical-physical properties unchanged in time.

In an alternative embodiment (not illustrated), the fibre clamping element is integral with the second upper body 7. In another alternative embodiment (also not illustrated), the fibre clamping element can be an element obtained through moulding and provided with a surface having a corrugated or at least not flat profile so as to ensure a good friction with the bare fibre without also damaging it.

The cavity 20 of the base body 5 is substantially parallelepiped in shape and acts as a joint between the recess 10 and the grooves 13. The cavity 21 of the second upper body 7 has a form which corresponds with that of the cavity 20. The cavity 20 then joins to the two grooves 13 through respective countersinks or counterbores 22 having depth which decreases towards the grooves 13. Corresponding countersinks or counterbores 23 with variable depth are formed on the face 600 of the first upper body 6.

From the description of above it can be inferred that, from the structural point of view, the system for housing and holding the cable 2 in the upstream portion 5a of the base body 5 substantially mirrors that of the second upper body 7. In the same way, the system for housing and guiding the bare optical fibres in the downstream portion 5b of the base body 5 substantially mirrors that of the first upper body.

The base body 5, comprises a first pair of seats 24a, 24b intended to cooperate with respective fins 25a, 25b formed on the side of the second upper body 7 to guarantee a snap-fitting of the second upper body 7 on the base body 5, and a second pair of seats 26a, 26b intended to cooperate with respective pins 27a, 27b formed on the side of the first upper body 6 to guarantee a snap-fitting of the first upper body 7 on the base body 5.

The base body 5 comprises, moreover, on its upper face 500, a recess 28 adapted to house a corresponding projection 29 formed on the lower face of the first upper body 6; the recess 28 and the projection 29 are intended to cooperate to precisely align the first upper body 6 on the base body 5.

The first upper body 6 comprises, on one of its upper faces 650, a seat 32 which, as described below, is adapted to allow the blocking of the connector 1 into a receptacle of a connection device for optical fibres.

The cover 4 is substantially parallelepiped in shape and is mobile between a first operational position (illustrated in FIG. 1) wherein the cover houses inside of it the bare end portions 100 of the optical fibres which project from the main body 3 of the container 1, and a second operational position (not illustrated), wherein the cover is moved onto the main body 3 and leaves completely uncovered an end portion of predetermined length of the aforementioned bare end portions 100 of the optical fibres which project from the main body 3. Advantageously, the connector 1 is structured in such a way that when the cover 4 is put in the second operational position, it covers however an initial part of predetermined length of the bare end portions 100 of the optical fibres which project from the main body 3; preferably, said initial part of predetermined length is about 1–2 mm in length.

In an embodiment of the connector of the invention the cover 4, when brought into its second operational position, leaves a part of fibre of at least 3 mm and preferably of about 10–11 mm completely uncovered. The cover 4 thus, in its movement between the first and the second operational position, shifts by at least 3 mm and preferably by about 10 mm. The total length of the connector with the cover 4 in its second operational configuration (i.e. of the main body 3 associated with the cover 4 in its second operational position) is, for example, about 29 mm and the height of the cover 4 is, for example, about 8 mm.

Moreover, the cover is of a size such as to allow, when it is in its first operational position, the removal of the second upper body 7.

On the lower face of the base body 5 two longitudinal grooves 30 are formed; said grooves are suitable for acting as sliding guides for the cover 4. Each of the grooves 30 comprises opposing abutment elements (not illustrated) suitable for defining the stopping positions of the cover 4 in the first and in the second operational positions.

Moreover, a longitudinal seat 31 for a counter-spring (not illustrated) is formed on the lower face of the base body 5; said spring is adapted, in rest state, to keep the cover 4 in said second operational position. In one example, the spring is sized in such a way as to have, in rest state, a length equal to about 14 mm.

On a frontal surface 40 of the cover 4 a pair of preferably circular openings 41 are formed; said openings are suitable for allowing the passage of the terminal portions of the bare end portions 100 of the optical fibres when the cover 4 is moved from the first to the second operational position. The openings 40, advantageously, are of a size which is much larger than the transversal size of the bare fibres 100, so as not to interfere with said fibres 100 during the movement of the cover between the first and the second operational position. Preferably, the size of the opening 40 is no less than 1 mm; more preferably, when they are adapted to cooperate with respective ferules (as described below) such openings have a diameter which is at least 10–15% larger than the outer diameter of the ferule.

On the upper face 400 of the cover 4 is formed a through-opening 42 which, as described below, is suitable for cooperating with the seat 32 formed on the first upper body 6 to allow the blocking of the connector 1 in a receptacle of a connection device for optical fibres. Moreover, on the upper face 400 of the cover 4 is formed a slot 43 intended to house, when the cover 4 is in the second operational position, a reinforcement element 44 provided on the upper face 750 of the second upper body 7.

The base body 5, the upper bodies 6 and 7 and the cover 4 are advantageously made of a plastic material and through injection moulding; it is possible, for example, to use amorphous plastics such as reinforced polycarbonate (PC) with between 0 and 40% glass, or Acrylonitrile-Butadiene-Styrene (ABS), polyethylene (PE), polypropylene (PP), etc., reinforced with between 0 and 30% glass. Advantageously, the material chosen can be a self-extinguishing material with predetermined characteristics of dimensional stability and elasticity. Preferably, the material selected is a plastic material with a moulding shrinkage of less than 0.7%, more-preferably less than 0.5%, even more preferably less than 0.4%.

In the preferred embodiment of the connector of the invention, the base body 5, the upper bodies 6 and 7 and the cover 4 are all made of the same material: it is, however, possible to use different materials for the individual elements mentioned above.

The connector 1 of the present invention is, therefore, advantageously composed of four main parts: base body 5, first upper body 6, second upper body 7 and cover 4. The first upper body 6 is adapted to be associated with the base body 5 directly by the manufacturer; the manufacturer then associates the cover 4 with the base body 5 which is assembled with the first upper body 6 (illustrated in FIG. 5). The operations which the operator has to carry out on site in order to associate the cable 2 with the connector 1 are thus reduced, advantageously, to the following steps: removing the outer sheath of the cable for a predetermined length of cable, removing (cutting or folding back) the reinforcement fibres, optionally removing the plastic inner tube which houses the fibres for an end part of fibre of predetermined length, removing the acrilate outer coating of the fibre so as to obtain for each fibre a part of predetermined length of bare fibre, inserting the bare fibre in the fibre housing channels defined by the grooves 13 and 14 (such an insertion is made easier by the presence of the counterbores 22 and 23), positioning the cable 2 in the appropriate seat provided in the upstream portion 5a of the base body of the main body 3, positioning the fibre clamping element in the appropriate cavity 20 and 21 and mounting the second upper body 7 onto the upstream portion 5a of the base body 5. By doing so the cable 2 is associated in a stable manner with the main body 1, the initial parts 110 of the bare end portions 100 of the optical fibres are clamped onto the main body by the sandwiching action of the fibre clamping elements, whereas the bare end portions 100 of the optical fibres are housed in the housing channels defined by the grooves 13 and 14, with an end part of bare fibre of predetermined length which projects from the main body 3. The cover 4 is in its first operational position and therefore completely houses inside of it the bare fibres which project from the main body 3.

Figure 19:
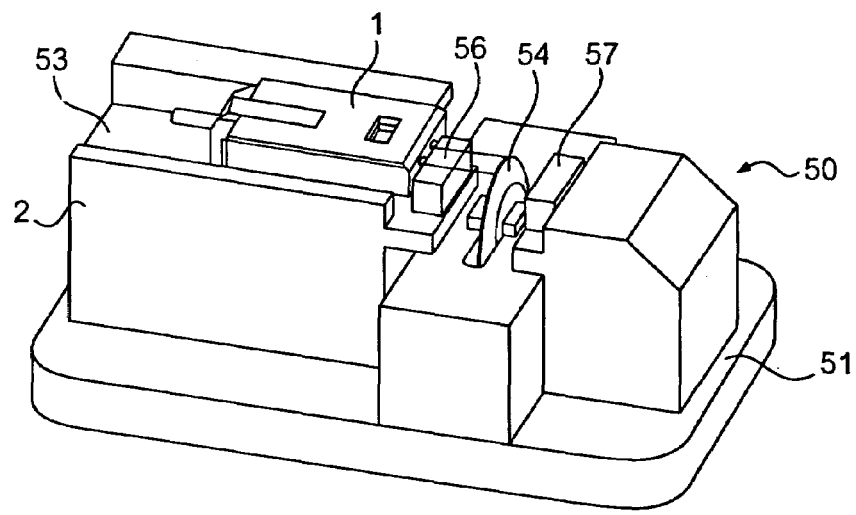
FIG. 19 is a schematic perspective view of a cutting machine with a sliding blade which houses the connector of FIG. 1.
Figure 20:
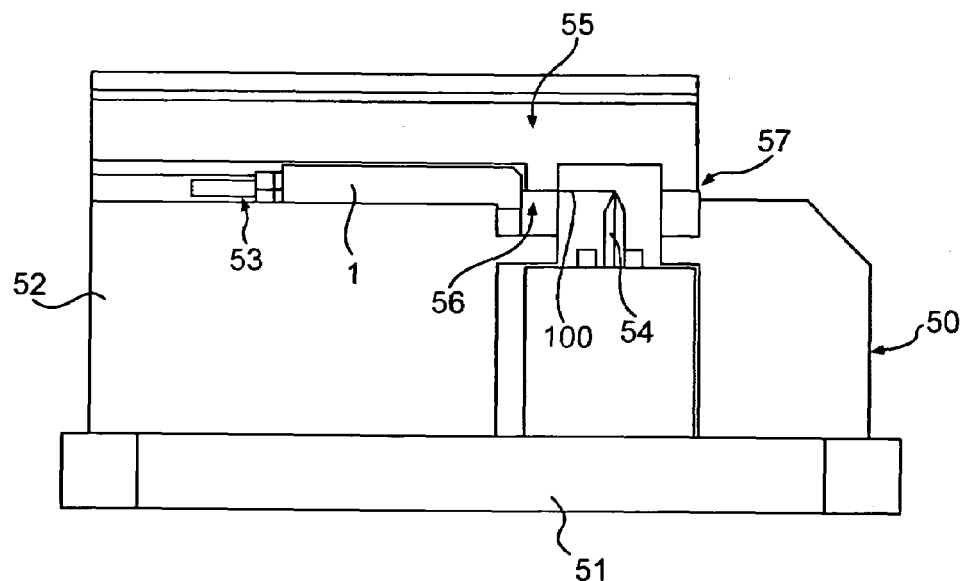
FIG. 20 is a side view of the cutting machine of FIG. 19.

According to a particularly advantageously aspect of the present invention, the connector 1 is designed in such a way as to allow its stable and precise housing in a conventional cutting machine with a sliding blade for cutting optical fibres (such as the cutter CT-07 of the company Fujikura often used by manufacturers and installers, or any other cutter compatible with this one); FIGS. 19 and 20 schematically illustrate such a machine, indicated with 50, with the connector 1 housed therein.

As already stated, the cutting machine 50 is of the conventional type and therefore will not be described in detail. It does, however, comprise a base 51 equipped with an upright 52 on which a seat 53 for housing the connector 1 is formed. The machine 50 comprises, moreover, a sliding blade 54 and a device 55 for blocking the bare end portions 100 of the optical fibres during the cutting operation.

The blade 54, in order to be able to cut through the bare fibres and guarantee a cut which is perfectly perpendicular to the optical axis of the fibres, is kept perpendicular to the plane where the two fibres and the connector 1 lie.

The fibre blocking device 55 comprises, in particular, a first pair of rubber bulbs 56 intended to sandwich the bare end portions 100 of the optical fibres upstream of the blade 54, and a second pair of rubber bulbs 57 intended to sandwich the bare end portions 100 of the optical fibres downstream of the blade 54.

In order to allow an accurate blocking of the fibre in the cutting machine, preferably on both sides of the cutting section, the Applicant has found that the fibre must project from the cover for at least 3 mm when the cover is in the second operational position.

The connector 1 described above is adapted to be associated with a receptacle to allow the optical connection of the bare fibres with respective opto-electronic components along respective optical connection axes.

Figure 9:
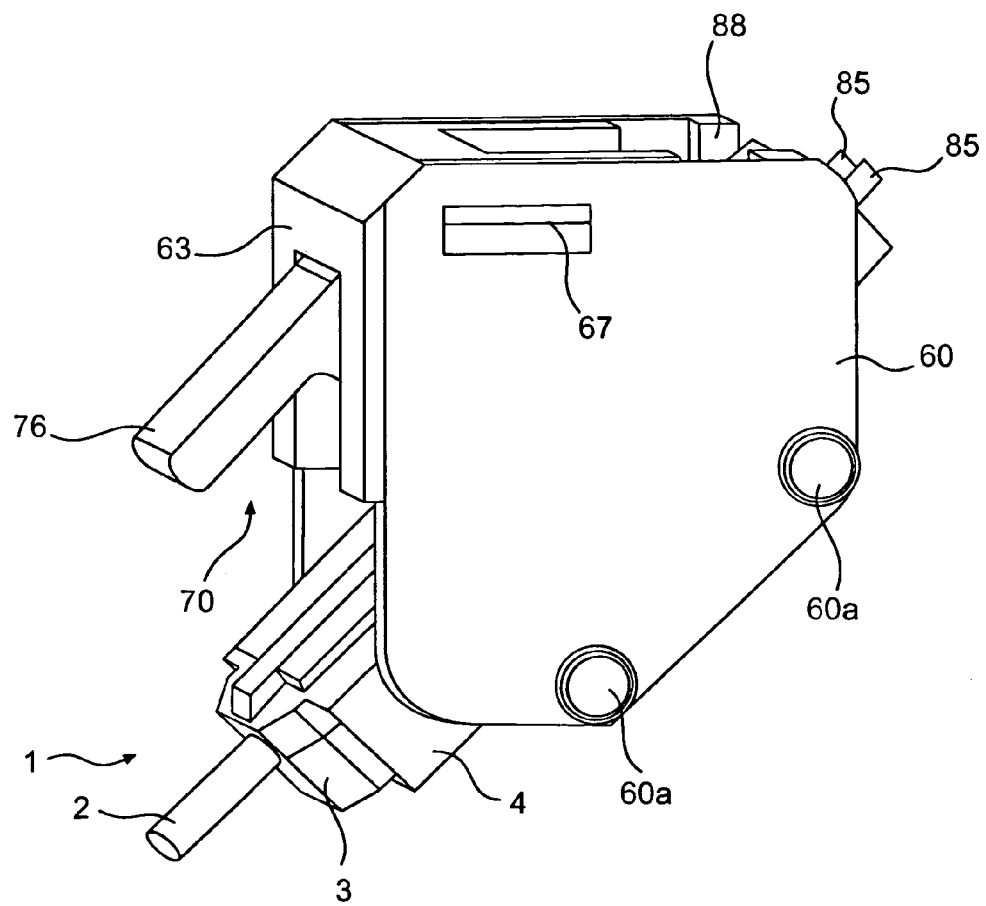
FIG. 9 is a schematic perspective view of a connection device according to the present invention in working configuration, with the connector of FIG. 1 associated with a receptacle.

FIG. 9 shows a connection device in accordance with the present invention, with the connector 1 associated with a receptacle 60. During the insertion of the connector 1 into the receptacle 60, the cover 4 moves from the first to the second operational position; in such a way the cover completely uncovers the bare end portions 100 of the optical fibres so as to allow the optical connection between the fibres and the respective opto-electronic connection components housed into the receptacle 60. In particular, in the specific case of a dual-fibre optical cable, a fibre can be optically coupled with a laser source, for example a VCSEL laser which emits in the first optical telecommunication window (800–900 nm), for example, about 850 nm, whereas the other fibre can be optically coupled with a photodiode.

Figure 10:
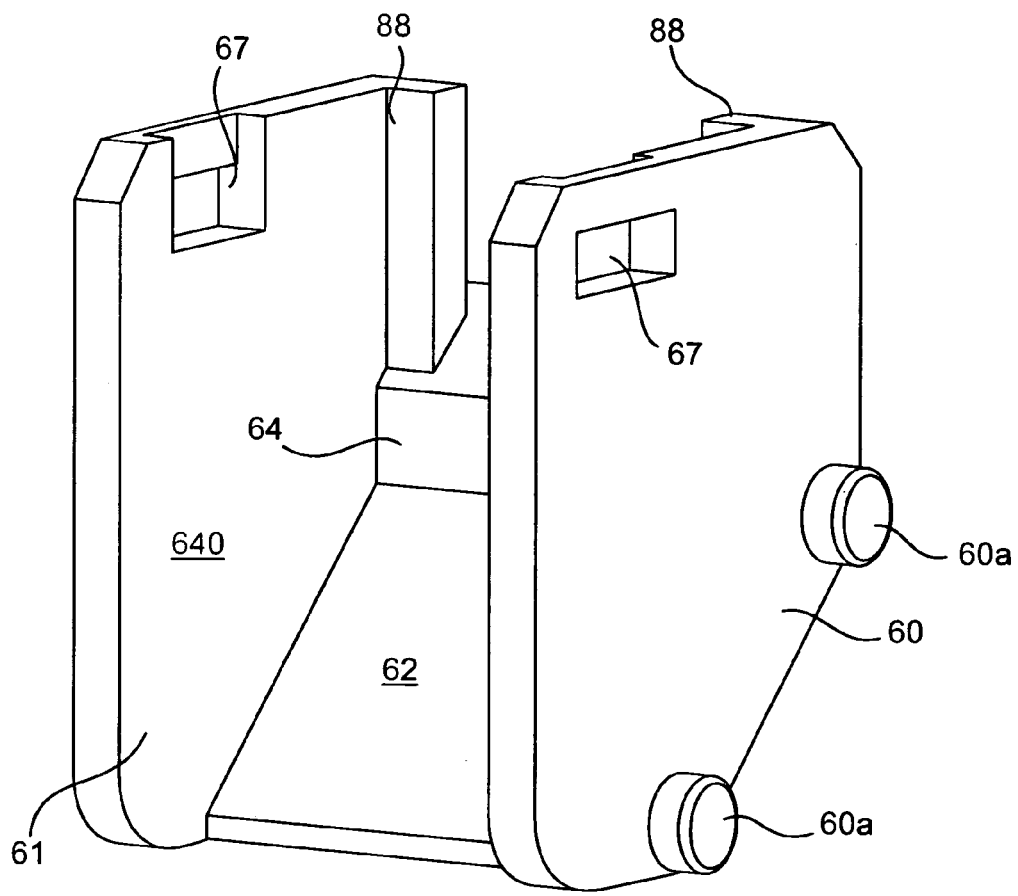
FIG. 10 is a schematic perspective view of a first structural element of the receptacle of the device of FIG. 9.

The receptacle 60 (FIG. 9 and FIG. 10) comprises a substantially parallelepiped container inside of which a seat 61 for housing the connector 1 is defined; in particular such a seat 61 is defined between a connector support surface 62 and a connector guide member 63.

The surface 62 is inclined with respect to the support plane of the receptacle (in the illustrated example at an angle equal to 45°, even though any other angle can be used), and defines in the receptacle 60 the insertion direction of the connector 1. The surface 62 has an edge 64, arranged at 135° with respect to the surface 62 and, thus substantially vertical, intended to act as an abutment and longitudinal alignment surface of the connector 1 inside the receptacle 60. When the connector 1 is inserted into the seat 61 of the receptacle 60, such an edge 64 acts on the cover 4 pushing it from the first to the second operational position.

Figure 11:
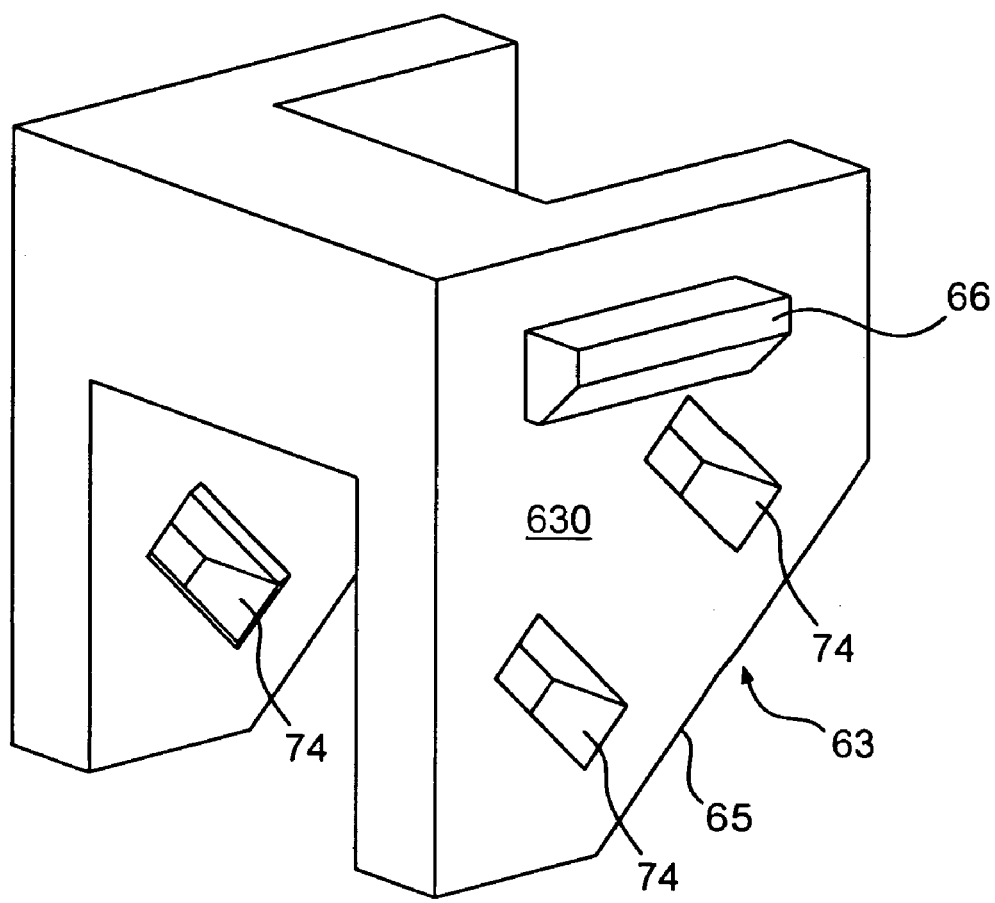
FIG. 11 is a schematic perspective view of a second structural element of the receptacle of the device of FIG. 9, such an element being intended to cooperate with the structural element of FIG. 10.

The connector guide member (FIG. 11) is mounted into the receptacle 60 above the support surface 62. It has a pair of lower surfaces 65 which are also inclined at an angle equal to 45°; they cooperate with the surface 62 thus defining the seat for housing the connector 1 and guiding said connector 1 inside the receptacle 60. The member 63 has, moreover, on the opposing outer side surfaces 630, teeth 66 adapted to be snap-fitted inside respective seats 67 which are provided on the opposing internal side surfaces 640 of the receptacle 60, so as to guarantee the stable positioning of the guide member 63 into the receptacle 60.

Figure 14:
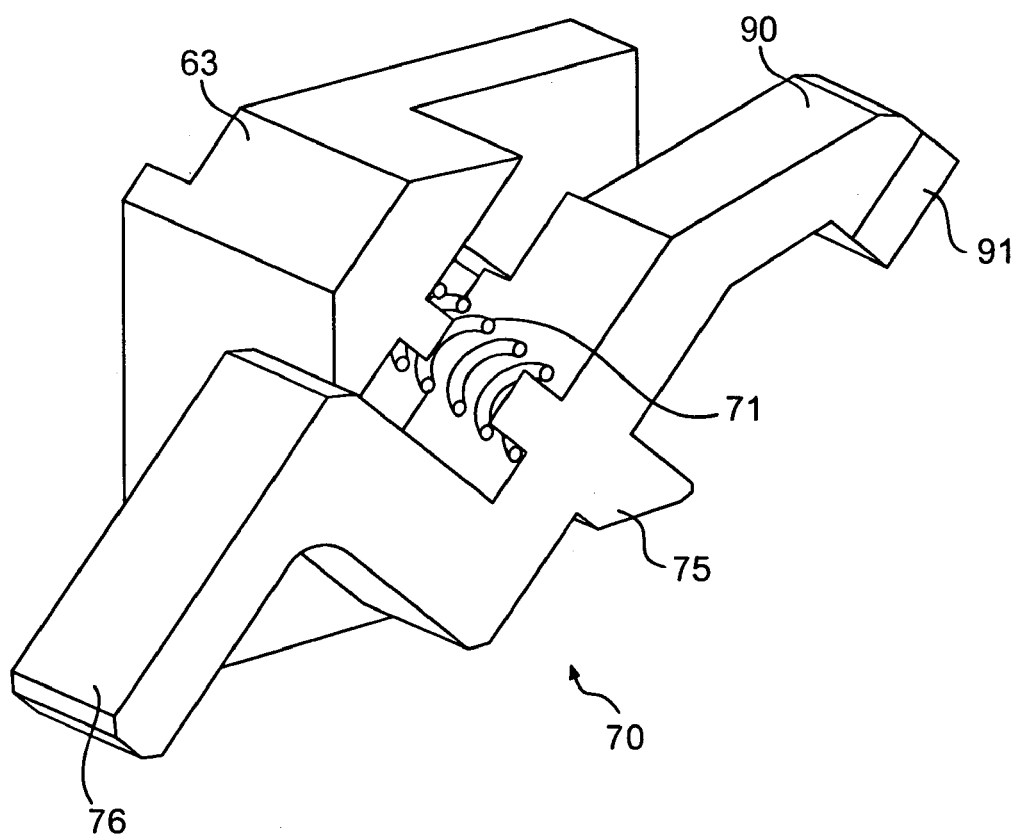
FIG. 14 is a schematic perspective partial view of the structural elements of FIGS. 11 and 13 assembled.

The receptacle 60 further comprises a device for blocking/unblocking the connector 1 to/from the receptacle 60. The device 70 is elastically associated with the connector guide member 63 through the interposition of a spring 71 (in particular, see FIG. 14).

Figure 12:
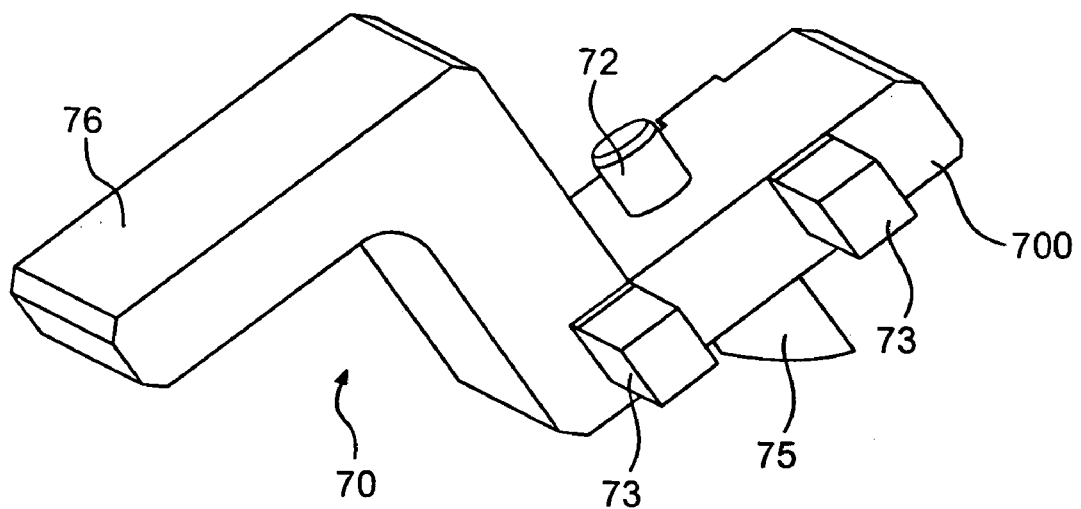
FIG. 12 is a schematic perspective view of a first embodiment of a fifth structural element of the receptacle of the device of FIG. 9, such an element being intended to cooperate with the structural elements of FIGS. 10 and 11.
Figure 13:
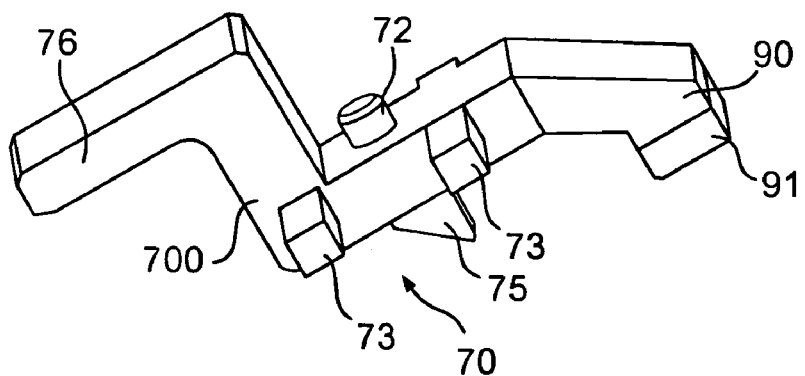
FIG. 13 is a schematic perspective view of a second embodiment of a fifth structural element of the receptacle of the device of FIG. 9, such an element being intended to cooperate with the structural elements of FIGS. 10 and 11.

FIGS. 12 and 13 illustrate two alternative embodiments of the device 70 for blocking/unblocking the -connector 1. In both of the embodiments, the device 70 has, on the upper surface, a seat 72 for the spring 71 and, on the opposite side surfaces 700, teeth 73 adapted to be snap-fitted into appropriate slots 74 formed on the opposing inner side surfaces 630 of the member 63 for guiding the connector. The slots 74 are sized so as to allow the displacement of the device 70 towards and away from the surface 62 for supporting the connector during the insertion of the connector 1 in the seat 61 of the receptacle 60.

On the lower surface of both the embodiments of the device 70, it is provided a tooth 75 suitable for being housed in the through-opening 42 of the cover 4 and in the seat 32 of the first upper body 6 for blocking the connector 1 in the seat 61 of the receptacle 60. The tooth 73 has a lower surface which is bevelled to facilitate the housing of said tooth 73 in the opening 42 and in the seat 32 during its insertion into the seat 61 of the receptacle 60, so as to allow the automatic coupling of the connector 1.

The device 70, in both of its embodiments, comprises, moreover, a lever 76 intended to allow the decoupling of the device 70 from the connector 1 and therefore from the seat 61 of the receptacle 60. To carry out such a decoupling operation, it is sufficient for the operator to lift the device 70 through the lever 76 opposing the elastic force of the spring 71; by doing so the tooth 75 comes out of the seat 32 of the first upper body 6 and of the opening 42 of the cover 4, thus releasing the connector 1.

Figure 15:
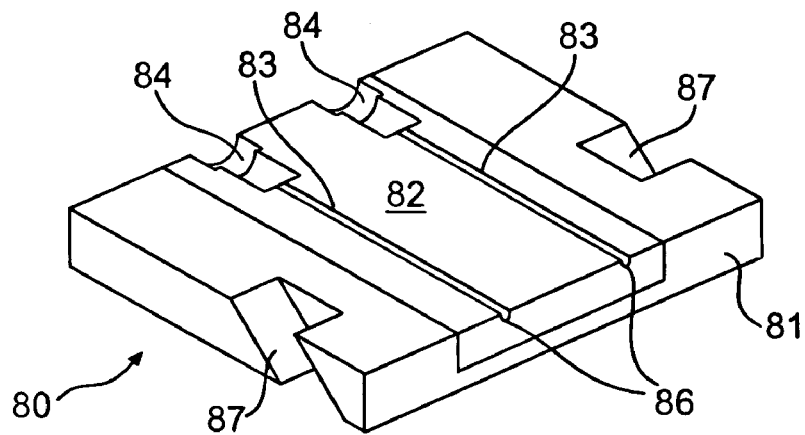
FIG. 15 is a schematic perspective view of a sixth structural element of the receptacle of the device of FIG. 9, such an element being intended to cooperate with the structural element of FIG. 13.

The high precision optical alignment between the bare end portions 100 of the optical fibres and the respective opto-electronic connection components is realised providing, into the receptacle 60, a suitable optical alignment device 80. FIGS. 15 and 17 show two alternative embodiments of the optical alignment device 80: the embodiment illustrated in FIG. 15 is adapted to cooperate with the embodiment of the connector blocking/unblocking device 70 illustrated in FIG. 13 (see, in particular FIG. 16), whereas the embodiment of the optical alignment device 80 illustrated in FIG. 17 is adapted to cooperate with the embodiment of the connector blocking/unblocking device 70 illustrated in FIG. 12 (see, in particular, FIG. 18).

The optical alignment device 80 is housed into the receptacle 60 behind the seat 61 for housing the connector 1 and can be inclined at a predetermined angle with respect to the insertion direction of the connector 1 into the receptacle 60. In order to avoid subjecting the fibres to undesired stresses, such an angle is, however, selected so as to be less than about 20°. Preferably, as illustrated in the attached figures, the alignment device 80 is mounted so as to be substantially coplanar with the insertion direction of the connector 1 into the receptacle 60 (angle of inclination equal to zero).

Figure 16:
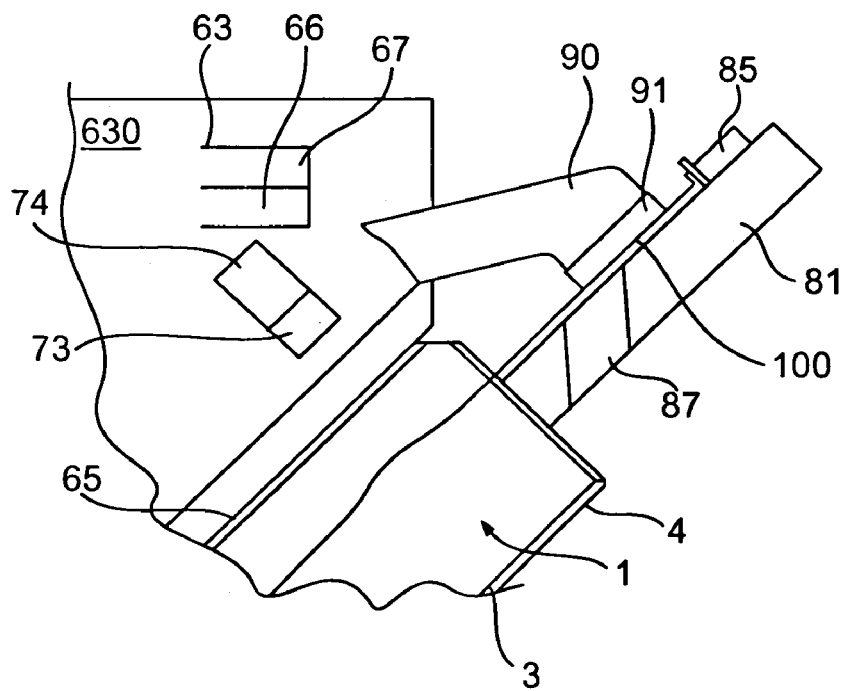
FIG. 16 is a schematic partial and side view of the structural elements of FIGS. 11, 13 and 15 assembled with the connector of FIG. 1.
Figure 17:
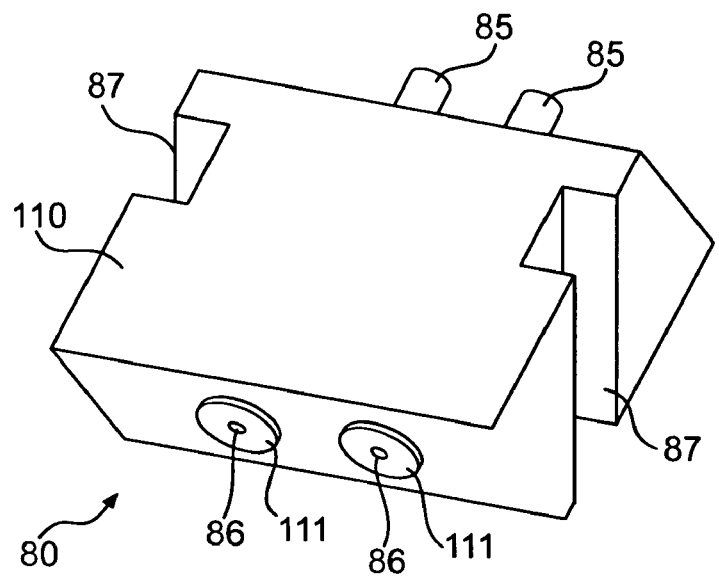
FIG. 17 is a schematic perspective view of a seventh structural element of the receptacle of the device of FIG. 9.

With reference to the embodiment of the optical alignment device 80 illustrated in FIG. 15 and 16, such a device comprises a base structure 81 which houses an insert 82, preferably made of silicon, on which two longitudinal grooves 83, preferably V-grooves, are formed; said grooves have high precision (i.e. have a precision in the order of μm).

On the insert 82, at a free end of each groove 83, a seat 84 intended to house an opto-electronic component 85 is formed. As illustrated in FIG. 16, such a component is clamped in the respective seat 84 with its active surface facing towards the groove 83.

On the insert 82, at the other free end of each groove 83, is formed a countersink or counterbore 86 adapted to facilitate the housing and the alignment of the bare end portions 100 of the optical fibres in the grooves 83 when the connector 1 is inserted into the seat 61 of the receptacle 60.

The grooves 83 are sized in such a way that, when the bare end portions 100 of fibre are positioned therein, the face of the free end of such fibre portions is perfectly aligned with the active surface of the opto-electronic component 85 along an optical connection axis.

The alignment precision is thus obtained thanks to the fact that the opto-electronic component 85 is associated with the insert 82 so as to be optically aligned with that which will be the optical axis of the bare fibre when the fibres are housed in the grooves 83. Therefore a state of self-alignment of each fibre with the respective opto-electronic component 85 is advantageously realised when the connector 1 is inserted into the seat 61 of the receptacle 60.

Advantageously, to guarantee the perfect stability of the optical alignment between fibre and opto-electronic component 85, the grooves 83 are inclined at a predetermined angle, preferably of 1°–3° with respect to the optical axis of the fibre and towards the opto-electronic component 85. This is obtained either by realising some grooves with variable depths or, preferably, by realising an inclined plane for supporting the insert 82 in the base structure 81 (alternatively, the entire base structure 81 can be inclined at the desired angle). In this way, the fibre is kept pressed against the grooves 83 by its elasticity.

Preferably, the grooves 83 are of a depth between 0.0625 mm and 0.126 mm.

On the opposing side surfaces of the base structure 81 are formed guides 87 suitable for co-operating with respective counterguides 88 formed on the inner side surfaces 640 of the receptacle 60, in order to align the base structure 81 with the seat 61 of the receptacle 60.

As illustrated in FIG. 13, the connector blocking/unblocking device 70, in an embodiment thereof, is integrally associated with a fibre blocking member 90; such a member is adapted to cooperate with the base structure 81 when the connector 1 is inserted into the receptacle 60 to hold, in a substantially stable manner, the bare fibres into the grooves 83.

Preferably, the fibre blocking member 90 comprises, at one of its free ends, an element 91 made of soft material (e.g. rubber or silicon); such an element is adapted to come into contact with the bare fibres housed in the grooves 83 when the connector 1 is inserted into the receptacle 60.

Advantageously, the fibre blocking member 90 activates automatically at the end of the insertion of the connector 1 into the receptacle 60; indeed, such a member lowers so as to block the bare fibres against the grooves 83 only when the connector blocking/unblocking device 70, which is pushed by the spring 71, lowers to block said connector in the seat 61 of the receptacle 60.

Figure 18:
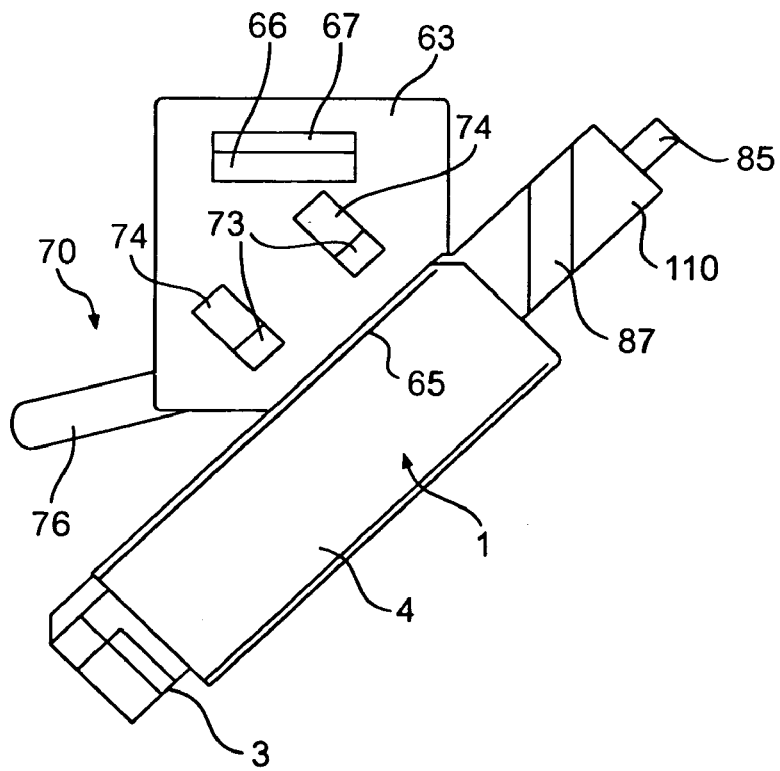

Reference is now made to the alternative embodiment of the optical alignment device 80 illustrated in FIGS. 17 and 18. In such an embodiment, the device 80 comprises a substantially parallelepiped body 110 which houses a pair of ferules 111 each of which being provided with a calibrated inner hole.

An opto-electronic component 85 is clamped to each ferule 111, at one of its free ends, in such a way that its active surface is facing the ferule 111. Such a component 85 is perfectly aligned with the calibrated hole of the ferule 111.

Each ferule 111, at the other free end, has a countersink or counterbore 86 adapted to facilitate the housing and the alignment of the bare end portions 100 of the optical fibres into the holes of the ferules 111 when the connector 1 is inserted into the seat 61 of the receptacle 60.

The ferules 11 are positioned in the receptacle 60 in such a way as to be perfectly aligned with the seat 61 for housing the connector 1.

The alignment precision is thus obtained thanks to the fact that the ferules 111 are positioned in the receptacle so that the calibrated holes are perfectly aligned with that which will be the optical axis of each bare fibre when the connector 1 is inserted into the seat 61 of the receptacle 60. Therefore, a state of self-alignment of the fibre with the opto-electronic component 85 is advantageously realised when the connector 1 is inserted into the seat 61 of the receptacle 60.

In an example, ferules of 10.5 mm with an outer diameter of 2.5 mm or else 1.25 mm are used. The inner diameter is chosen depending upon the type of optical fibres provided to be used. For example, ferules with an inner diameter of 127 µm are advantageously used for fibres with a diameter of 125 µm to allow an insertion of the fibre in the ferule without friction.

Advantageously, the ferules 110 are adapted to be partially housed into the openings 41 of the cover 4 when the connector 1 is inserted into the receptacle 60 (see FIG. 18).

In the same way as described above with reference to the other embodiment of the fibre alignment device 80, guides 87 are formed on the opposing side surfaces of the body 110; said guide are suitable for cooperating with the counterguides 88 formed on the inner side surfaces 640 of the receptacle 60 for aligning the body 110 with the seat 61 of the receptacle 60.

Advantageously, the slots 74 of the member 63 for guiding the connector are preferably inclined at an angle between 2° and 4° with respect to the normal to the insertion direction of the connector so as to produce a thrust from the tooth 75 of the connector blocking/unblocking device 70 not just in the direction of the thrust of the spring 71, but also in the insertion direction of the connector, so as to guarantee a more stable contact between connector 1 and the alignment device 80 (in both of the embodiments described above).

For both of the embodiments of the alignment device 80, the longitudinal alignment is ensured by keeping the bare fibres pressed against the active surfaces of the opto-electronic components 85. Advantageously, the length of the bare fibre which projects from the main body 3 is predetermined in such a way as to provide for an excess of fibre with respect to the length which is strictly necessary to realise the optical connection; such an excess of fibre causes a slight arching of said fibre when this comes into contact with the active surface of the opto-electronic component 85, thus generating a force which keeps the fibre pressed against such an active surface of the component 85. The fibres are, indeed, constrained to the main body 3 exclusively by the pair of rubber bulbs 22 and 23 which sandwich the initial parts 110 of fibre in the zone defined by the cavities 20 and 21. Downstream of such a zone, the fibres are free to slide and thus to flex (FIG. 16 schematically illustrates the operational characteristic of the device of the invention with the fibre being arched). Preferably, the excess of length of fibre is between 0.2 mm and 1 mm, for example 0.3 mm; such an excess of fibre ensures that when the coupling has been carried out the fibre is arched with a predetermined angle of curvature depending upon the length of the part of fibre which is free to flex. It is, however, advantageous not to have angles of curvature in the fibre which are greater than 20° to avoid subjecting the fibre to unwanted stresses which could cause the breaking or at least a reduced reliability thereof.

The Applicant has found that the maximum angle of curvature which the fibre can take up without being subjected to unwanted stresses depends, however, upon the length of fibre which is completely free to flex. Table 1 displayed below shows, for lengths of fibre free to flex from 4 to 15 mm, the maximum angle of curvature allowed.

TABLE 1

| length of fibre free to flex (mm) | Maximum angle (°) |
| --- | --- |
| 4 | 5 |
| 5 | 7 |
| 6 | 8 |
| 7 | 10 |
| 8 | 11 |
| 9 | 13 |

TABLE 1-continued

| length of fibre free to flex (mm) | Maximum angle (°) |
|---|---|
| 10 | 14 |
| 11 | 15 |
| 12 | 17 |
| 13 | 18 |
| 14 | 19 |
| 15 | 20 |

Table 1 shows that for a length of fibre free to flex equal to 15 mm the maximum angle of curvature allowed so that the fibre is not subjected to unwanted stresses is 20°; such an angle, however, decreases as the length of the fibre free to flex decreases. Lengths of fibre free to flex greater than 15 mm are unadvisable since they would require connector lengths which are not very compatible with the requirements of miniaturisation prescribed by the specific application of this type of optical connector.

The part of fibre free to flex comprises the zone housed at the recess 140 (if there is the recess) and the part of fibre outside of the main body 3 up to the point of contact between the fibre and the groove 83 or the ferule 111.

Figure 21:
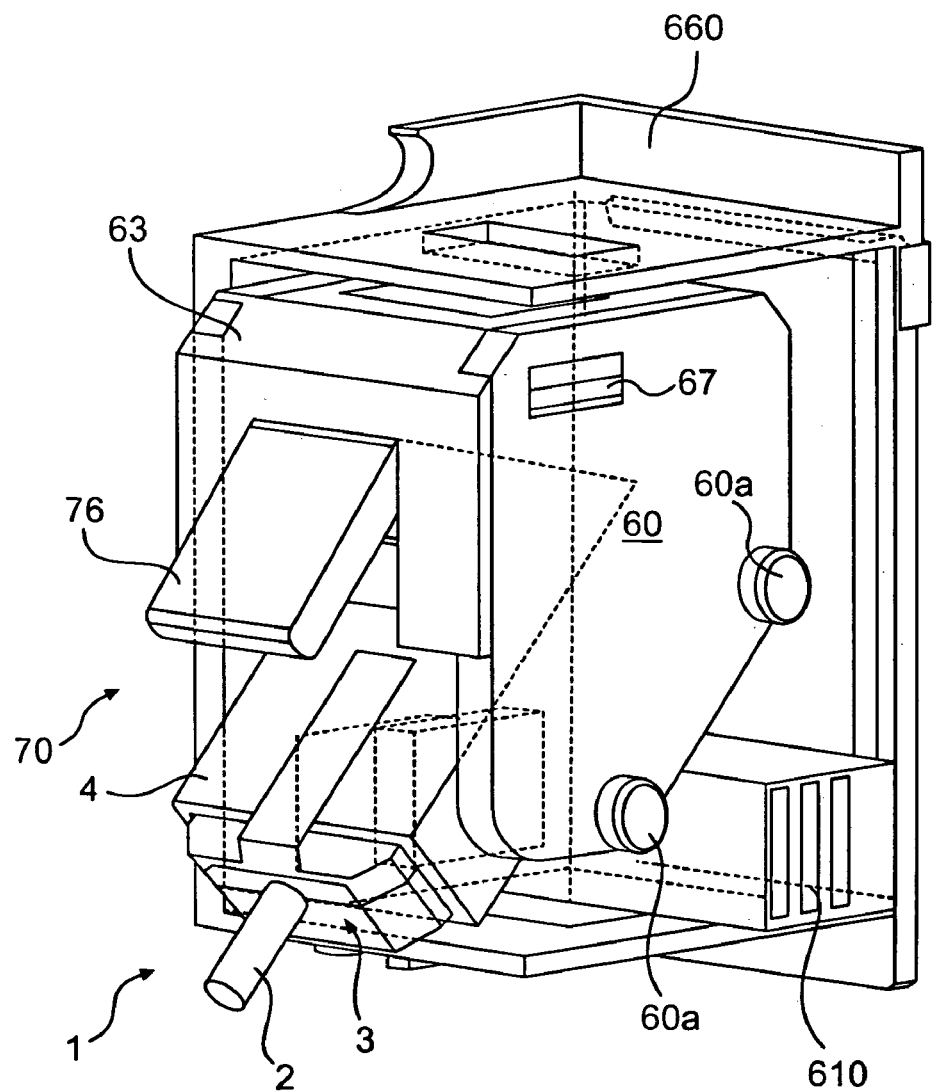
FIG. 21 is a partially sectioned schematic perspective view of an electric fruit containing the connection device of FIG. 9.

Advantageously, the receptacle 60 is adapted to be mounted in a flat; it is therefore sized in such a way as to be housed in a conventional domestic electricity distribution system. In particular (FIG. 21), the receptacle 60 comprises a pair of pins 60*a* adapted to be housed in suitable holes 60*b* provided in a container 660 which has the same standardised size as the various electrical fruits of a conventional domestic distribution system. Advantageously, the receptacle 60 is thus of a standard size whereas the container 660 can be of different sizes depending on the electrical fruits. The container 660 houses only the electronics necessary for the operation of the opto-electronic components 85 associated with the receptacle and a bus system 610 which allows different fruits which are placed side by side to communicate with each other. In such a way it is possible to divide the electronic functions (conditioning the signal, separating the services, etc.) which are associated with different fruits, thus allowing a high modularity to be achieved.

Figure 22:
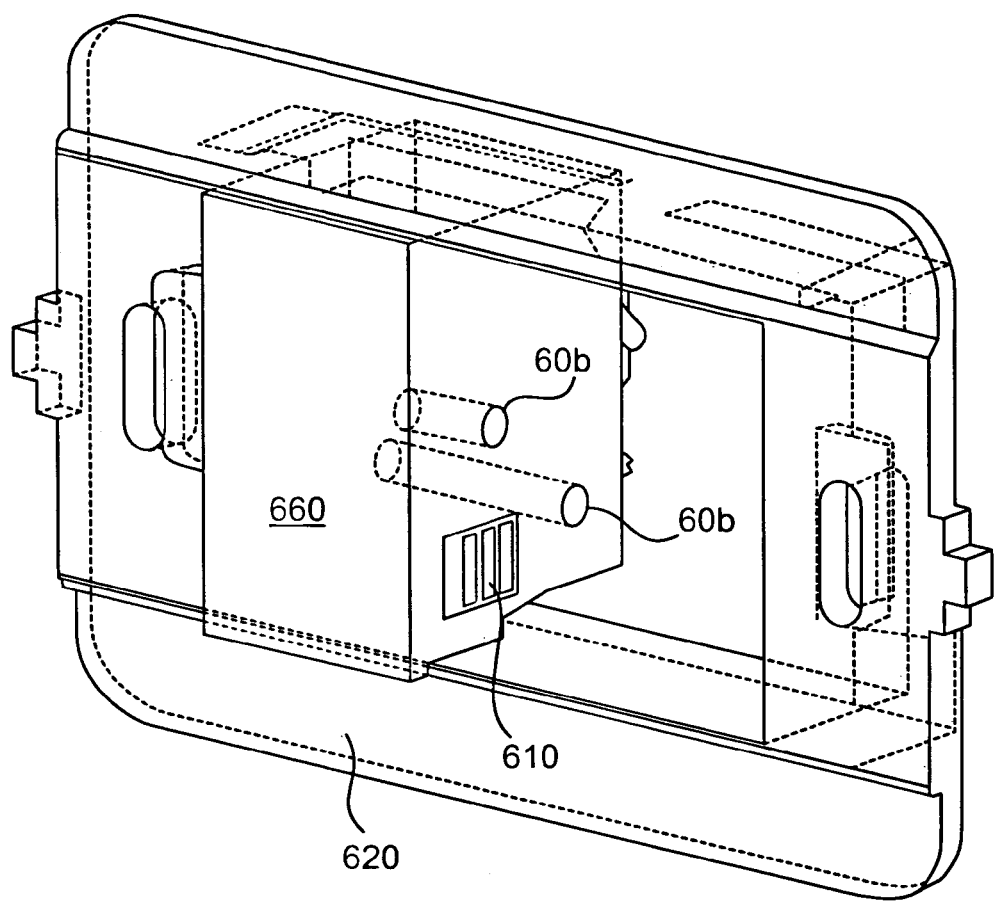
FIG. 22 is a schematic perspective view of a common fruit-holder for the electrical branching containing the electric fruit of FIG. 21.

The container 660 is then adapted (FIG. 22) to be housed in a fruit carrier 620 which, in turn, is adapted to be housed in a common domestic electricity branching case.

An optical signal distribution system comprises, for example, at least two optical cables suitable for connecting, inside a building, a central optical signal distribution apparatus (situated, for example, in the cellar or in the loft), with a plurality of user apparatuses (situated in respective offices or flats). Each optical cable is terminated, at least at the user apparatus end, by means of a connector of the type described above. Advantageously, one or more optical cables are terminated at both ends by means of optical connectors of the type described above.

In its operational configuration, the connector 1 is associated with the cable 2 as described above, whereas the receptacle 60 houses the guide member 60, the connector blocking/unblocking device 70 and the fibre alignment device 80 inside of it. The optical coupling between bare fibre and opto-electronic components 85 is achieved by inserting the connector 1 into the receptacle 60. During such an operation the sliding cover 4 abuts with the edge 64 of the connector support surface 62 provided in the receptacle 60 and moves from the first to the second operational position, leaving the bare end portions 100 of the optical fibres to protrude. These portions are guided by the counterbores 86 in the precision grooves 83 or in the calibrated holes of the ferules 111 and come into contact with the opto-electronic components 85. The excess fibre causes the same fibres to arch in the fibre housing channels provided in the main body 3 between the base body 5 and the first upper body 6; in this way the bare fibres are kept pressed against the active surfaces of the opto-electronic components 85. Once the insertion of the connector 1 in the seat 61 of the receptacle 60 is completed, the connector 1 is blocked in the receptacle 60 with the tooth 75 of the connector blocking/unblocking device 70 housed in the slot 42 of the cover 4 and in the seat 32 of the first upper body. The blocking/unblocking device 70 presses against the connector 1 and, in its embodiment illustrated in FIGS. 13 and 16, the fibre blocking member presses the bare fibre against the precision grooves 83.

To remove the connector 1 from the receptacle 60, the operator moves the lever 76 of the connector blocking/unblocking device 70. The tooth 75 comes out from the slot 43 of the cover 4 and from the seat 32 of the first upper body 1 and the connector can thus be removed from the seat 61 of the receptacle 60. During the removal, the cover 4 moves from the second operational position to the first operational position, thus completely covering the bare end portions of the optical fibres 100.

The present description has been made with explicit reference to a dual-fibre optical cable; it is, however, clear to a man skilled in the art that what has been described is equally applicable to a mono-fibre or multi-fibre cable.

FIGS. 23–27 disclose a second embodiment of the connector of the present invention. This connector is substantially similar to the connector 1 shown in FIGS. 1–22 and, therefore, will not be described in detail in the following of the present specification. Corresponding elements in FIGS. 1–22 and 23–27 have been indicated with the same reference numerals and will not be described again in detail. Only those structural elements which are shown in FIGS. 23–27 and not in FIGS. 1–22 will be described in detail. A person skilled in the art will recognise that what was said in respect to the connector of FIGS. 1–22 is applicable to the connector of FIGS. 23–27 and vice versa.

As shown in FIGS. 23 to 27, the connector 1 comprises a lid 201 associated with the cover 4 at the top surface 400 thereof. Specifically, the lid 201 has a first portion 202 firmly associated with the upper face 400 of the cover 4 and a second portion 203 associated with the first portion 202 at a folding line 204 thereof. The second portion 203 has an end wall 205 which is substantially adjacent to the frontal surface 40 of the cover 4. The end wall 205 (and thus the second portion 203 of the lid 201) can be moved from a first operational position, wherein the end wall 205 closes the openings 41 (see FIGS. 23 and 24), up to a second operational position, wherein the end wall 205 uncovers the openings 41 (see FIGS. 25 and 26).

The lid 201 is made of an elastic material, such as steel, preferably stainless steel or carbon steel, by moulding or pressing technology. The lid 201, at rest, stands in its first operational position thanks to the elasticity of the material, while in working position the lid is lifted up to the second operational position thus clearing the openings 41 and allowing the fibre 100 to protrude through these openings.

The lifting of the lid 201 from the first operational position up to the second operational position takes place automatically when the connector 1 is inserted into the receptacle (or the cutting machine), i.e. without any automatic or manual driving device being needed.

The receptacle comprises an abutment element (not shown) at its bottom surface which contacts a projecting end portion 205a of the end wall 205 of the lid 201 during insertion of the connector 1 into the receptacle, thus moving the lid up.

Figure 23:
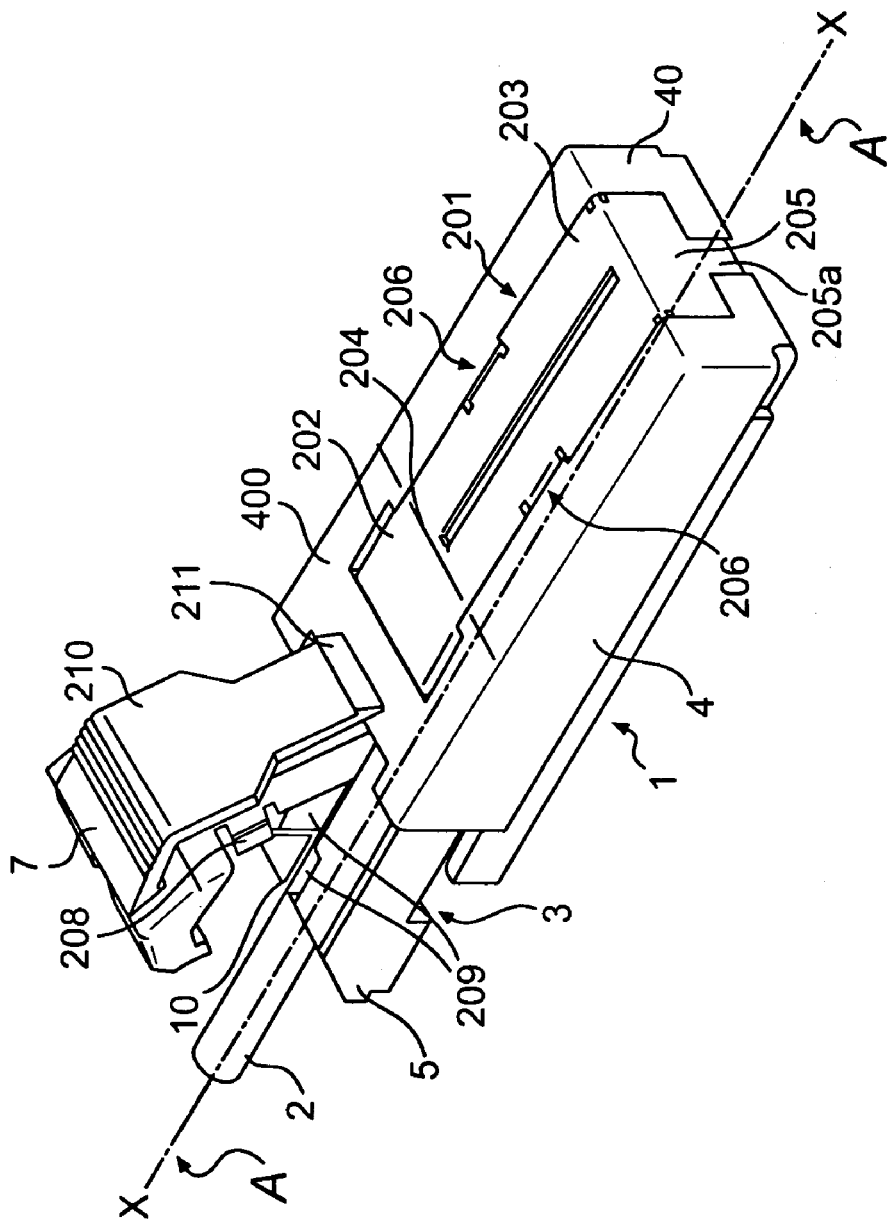
FIG. 23 is a schematic perspective view of a second embodiment of the connector according to the present invention, in a first operational configuration.
Figure 24:
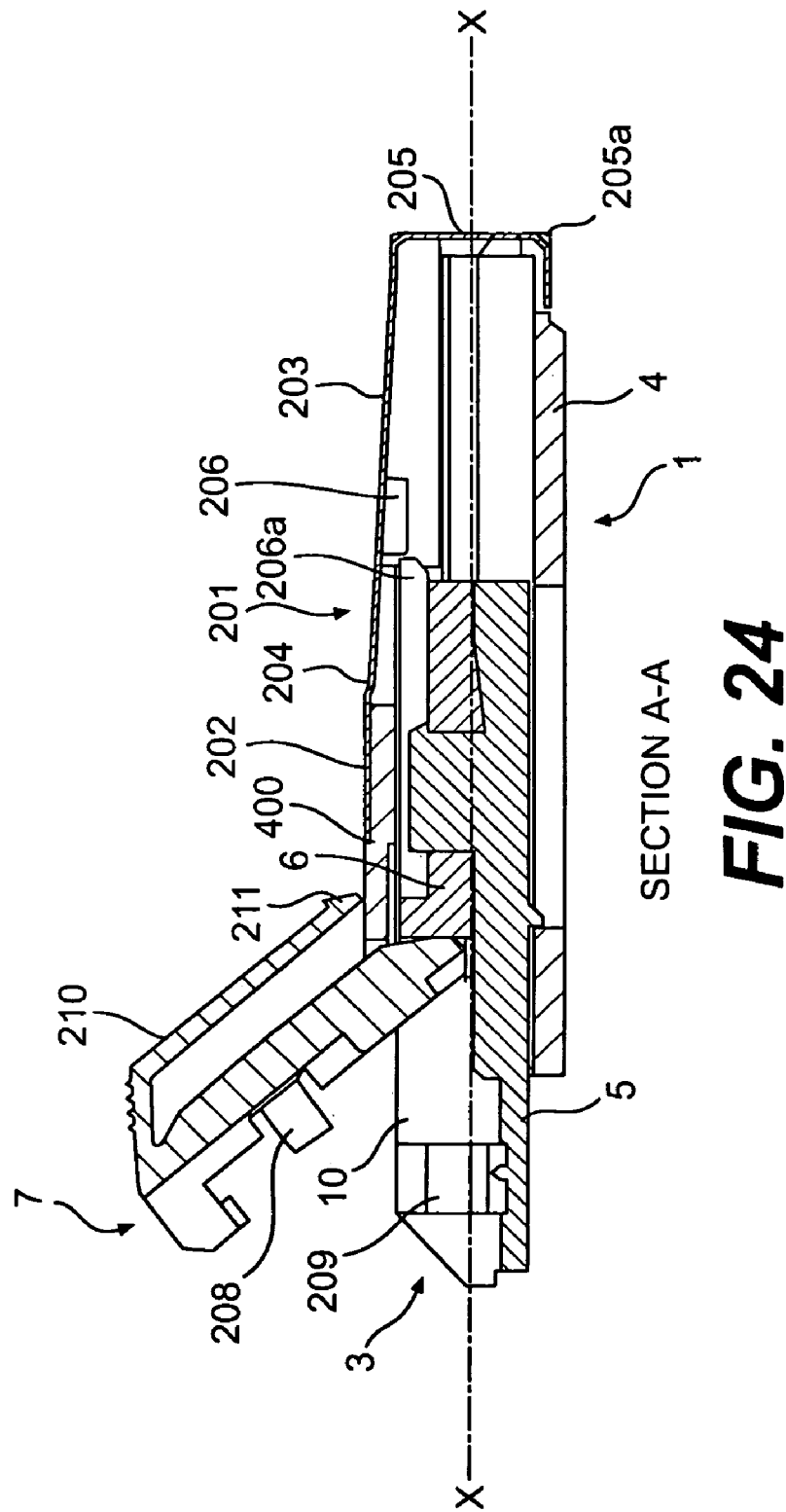
FIG. 24 is a longitudinal section taken along line A—A of the connector of FIG. 23.
Figure 25:
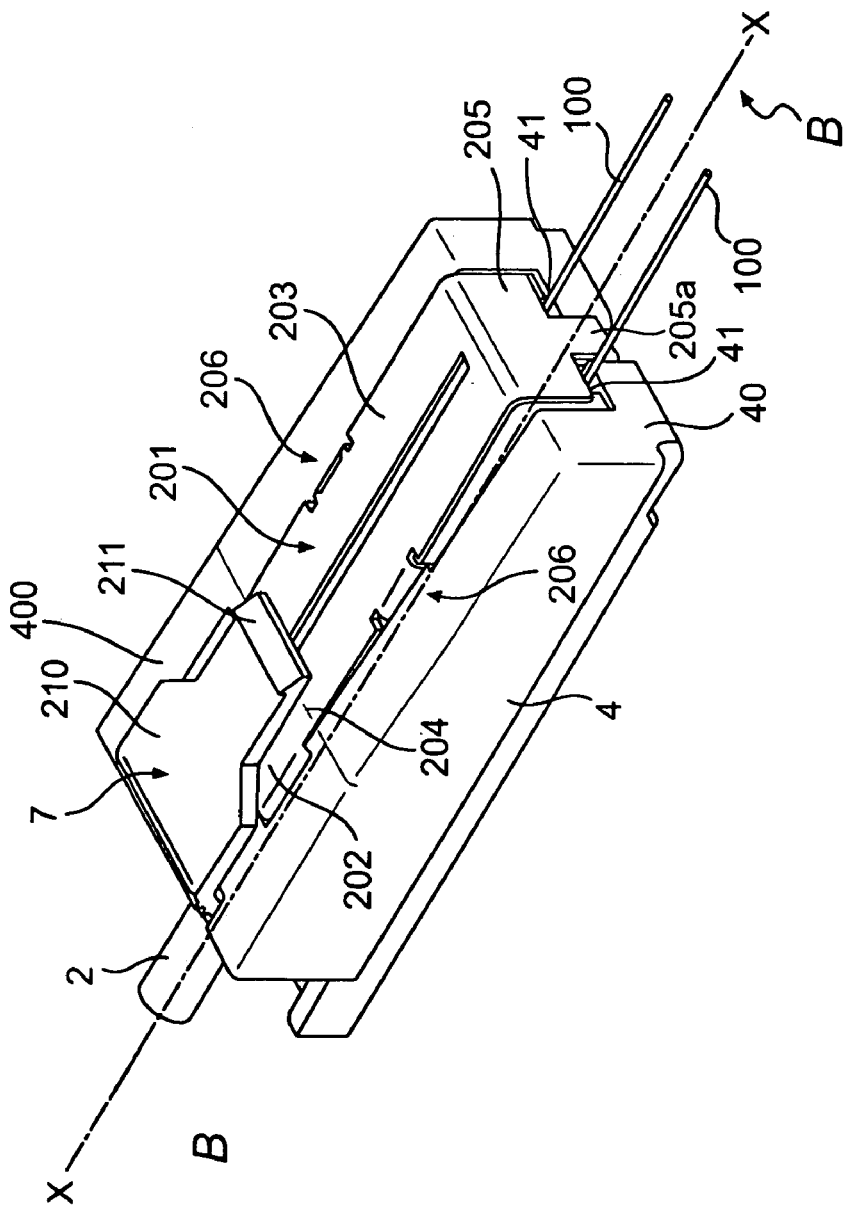
FIG. 25 is a schematic perspective view of the connector of FIG. 23, in a second operational configuration.
Figure 26:
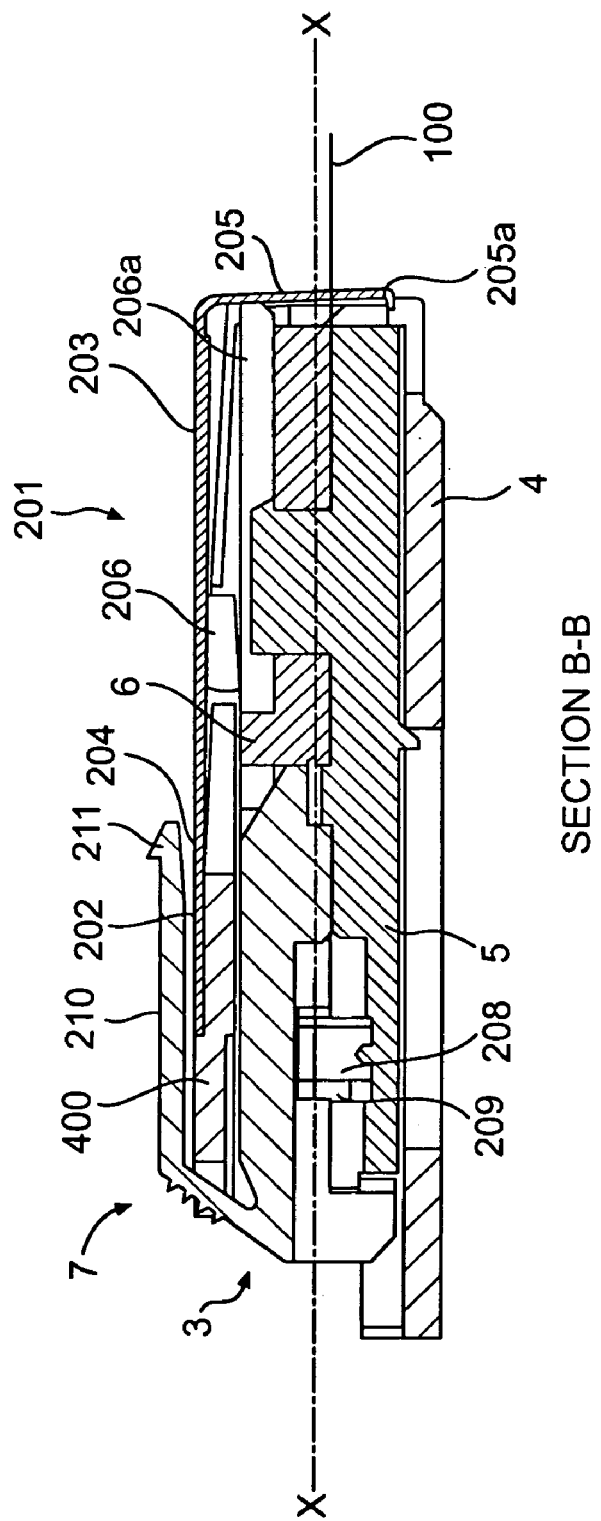
FIG. 26 is a longitudinal section taken along line B—B of the connector of FIG. 25.
Figure 27:
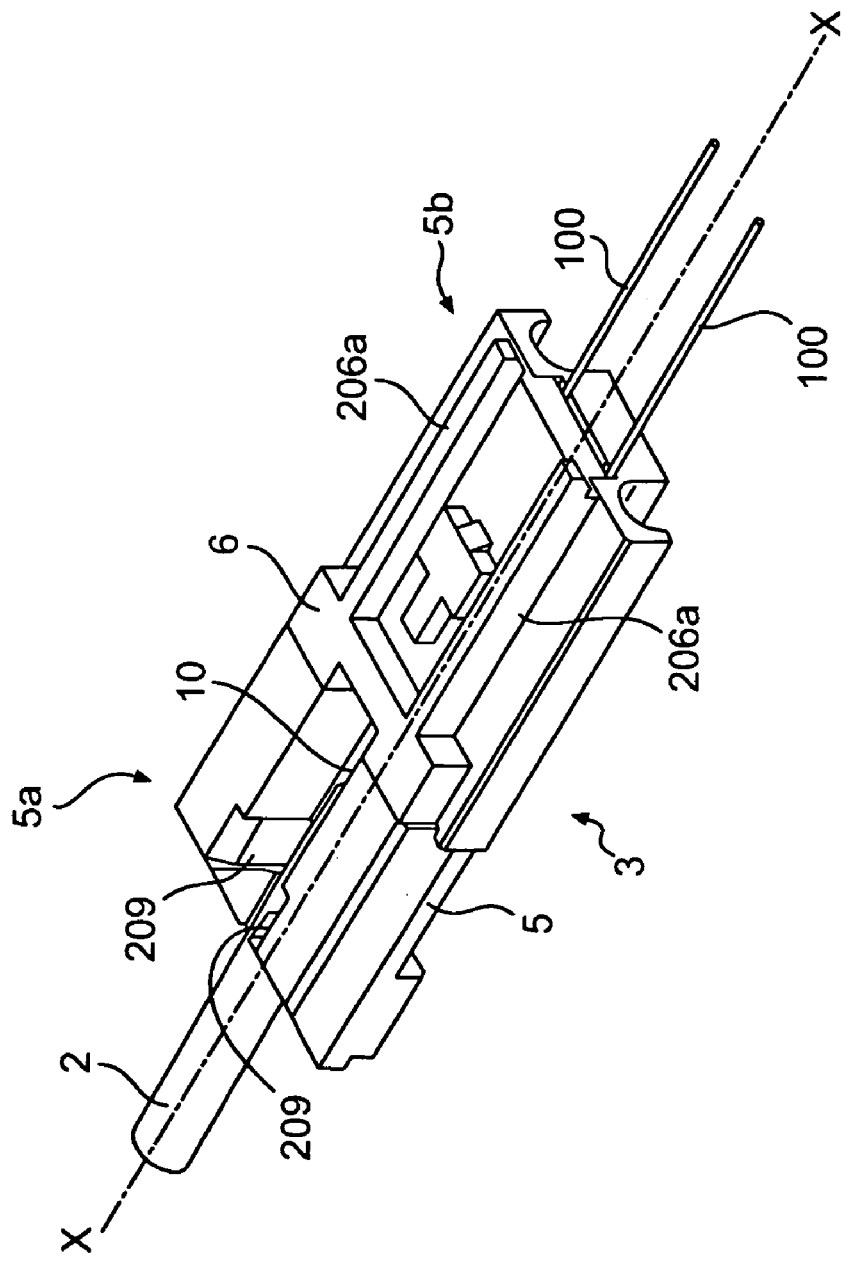
FIG. 27 is a perspective view of a first structural component of the connector of FIG. 23.

As clearly shown on FIG. 27, the main body 3 of the connector 1 shown in FIGS. 23–27 comprises a base body 5, a first upper body 6 and a second upper body 7 (this last being visible in FIGS. 23–26), as the connector 1 shown if FIGS. 1–22. Also in this case, the base body 5 comprises a longitudinal recess 10 defining a seat for the cable. The lid 201 further comprises two blocking members 206, projecting down from the lid 201, which prevent movement of the cover 4 from its first operational position to its second operational position when the connector 1 is not inserted into the receptacle. As shown in FIG. 24, when the lid 201 is in its first operational position, each of the blocking members 206 is in an abutment condition against a respective element 206a of the upper body 6 of the main body 3 of the connector. As shown in FIG. 26, when the lid 201 is moved up to its second operational position, the blocking members 206 are moved over the upper body 6 of the main body 3 thus allowing the cover 4 to slide with respect to the main body 3 of the connector.

The second upper body 7 of the connector shown in FIGS. 23–27 is pivoted to the base body 5 through a transversal hinge and is mobile from a first position illustrated in FIGS. 23 and 24 to a second position illustrated in FIGS. 25 and 26. In the second position, the upper body 7 is lowered toward the base body 5, thus clamping the cable located therebetween. The upper body 7 further comprises a pair of opposed projecting fins 208 adapted to cooperate with respective opposed walls 209 formed at the recess 10. When the upper body 7 is moved to the second position, the walls 209 push the fins the one toward the other, thus clamping the cable therebetween.

The upper body 7 further comprises an upper element 210 provided with a tooth 211 intended to be snap-fitted into a suitable hole formed into the receptacle, to block the connector inside the receptacle.

Preferably, the connector 1 of FIGS. 23–27 is compatible with a standard SFF (Small Form Factor) transceiver.

While the foregoing detailed description has been made with explicit reference to a fibre having a bare end portion of a predetermined length, the Applicant has verified that what said above also applies either to fibres having a very short bare end portion (preferably single mode fibres) and to fibres completely covered with the acrilate protective layer, i.e. wherein the length of the bare end portion is zero (preferably multimodal fibres). In particular, what said above applies to single mode fibres wherein the bare end portion is greater or equal to 0.5 mm in length (and preferably shorter than 3 mm), and to multimodal fibre completely covered and having just a bare end face. By the term "multimodal fibre" the Applicant wishes to indicate any fibre having a core with a diameter greater than about 10 μm, allowing the propagation of more than one mode and providing for a better tolerance with respect to the optical alignment with the connection component.

What is claimed is:

1. A device for connecting an optical fibre, comprising:
   a connector adapted to be associated with at least one optical fibre and to be inserted into a receptacle along a predetermined insertion direction so as to realise an optical connection along an optical connection axis between said at least one optical fibre and least one connection component housed in the receptacle, wherein said optical connection axis is inclined at an angle of less than 20° with respect to said predetermined insertion direction and wherein said connector comprises:
   a main body adapted to hold a first portion of an end part of at least one optical fibre and to leave a second portion of said end part of optical fibre projecting; and
   a cover slidably associated with said main body and mobile between a first operational position, wherein said cover houses said second portion of the end part of optical fibre inside of it, and a second operational position, wherein said cover leaves at least one bare end portion of predetermined length of said second portion of the end part of optical fibre completely uncovered, said cover further comprising at least one opening for the passage of said second portion of the end part of optical fibre, said at least one opening being of a size which is much larger than the transversal size of said second portion of the end part of optical fibre, so as not to interfere with said fibre during the movement of the cover between said first and second operational positions.

2. The device according to claim 1, wherein said predetermined length of said at least one bare end portion of optical fibre is greater than or equal to 0.5 mm.

3. The device according to claim 1, wherein said predetermined length of said at least one bare end portion of optical fibre is shorter than 3 mm.

4. The device according to claim 1, further comprising a lid associated with said cover and mobile between a first operational position, wherein said at least one opening is closed by said lid, and a second operational position, wherein said at least one opening is exposed to the outside.

5. The device according to claim 4, wherein when said cover is in its first operational position said lid is in its first operational position and when said cover is in its second operational position said lid is in its second operational position.

6. The device according to claim 1, wherein said main body comprises at least one guide element for said second portion of the end part of optical fibre.

7. The device according to claim 6, wherein said main body comprises:
   a base body provided with at least one first seat adapted to house said first portion of the end part of said at least one optical fibre and defining said at least one guide element;
   a first upper body adapted to be placed over and associated with said base body so as to define, at said first seat, a channel for housing said first portion of the end part of said at least one optical fibre; and
   at least one element for clamping at least one initial part of said first portion of the end part of optical fibre onto said base body.

8. The device according to claim 7, wherein said base body and first upper body are made of moulded plastic material.

9. The device according to claim 7, wherein said base body comprises an upstream portion provided with a first seat for housing a fibre-optic cable including said at least one optical fibre.

10. The device according to claim 9, wherein said main body comprises a second upper body adapted to be associated with said base body at said upstream portion of the base body and provided with a second cable housing seat intended to cooperate with said first cable housing seat when said second upper body is positioned onto said upstream portion of the base body, to hold in position, in a substantially stable manner, said fibre-optic cable.

11. The device according to claim 1, having a size which allows its stable and precise housing in a cutting machine with a sliding blade for cutting optical fibres.

12. The device according to claim 1, wherein said receptacle comprises:
- a connector housing seat extending along said predetermined insertion direction;
- a member for guiding said connector in said housing seat;
- a device for releasably blocking said connector in said housing seat; and
- a device for aligning said at least one second portion of the end part of optical fibre with said at least one connection component along said optical connection axis.

13. The device according to claim 12, wherein said connector housing seat comprises an abutment surface which is active on said cover when the connector is inserted into the receptacle so as to move said cover from said first operational position to said second operational position.

14. The device according to claim 12, wherein said alignment device comprises a base structure, said at least one connection component being integrally associated therewith, and comprising at least one high precision groove extending parallel to said optical connection axis and adapted to house, in a condition of optical alignment with said at least one connection component along said optical connection axis, said end portion of predetermined length of said second portion of end part of optical fibre.

15. The device according to claim 14, wherein said at least one high precision groove is inclined with respect to said optical connection axis at an angle equal to 1°–3°.

16. The device according to claim 14, further comprising a fibre blocking member integrally associated with said device for releasably blocking the connector and intended to cooperate with said base structure of the alignment device when the connector is inserted into the receptacle to hold, in a substantially stable manner, said end portion of predetermined length of said second portion of the end part of optical fibre in said at least one high precision groove.

17. The device according to claim 16, wherein said fibre blocking member comprises an element made of soft material and adapted to come into contact, when the connector is inserted into the receptacle, with said end portion of predetermined length of said second portion of the end part of optical fibre housed in said at least one high precision groove.

18. The device according to claim 12, wherein said alignment device comprises at least one ferule integrally associated with said connection component and provided with a calibrated hole extending parallel to said optical connection axis and adapted to receive said end portion of predetermined length of said second portion of the end part of optical fibre so that said fibre is substantially stable and in a condition of optical alignment with said connection component along said optical connection axis.

19. A connector for optical fibres, comprising:
- a main body adapted to hold a first portion of an end part of at least one optical fibre and to let a second portion of said end part of optical fibre project;
- a cover slidably associated with said main body and mobile between a first operational position, wherein said cover houses said second portion of the end part of optical fibre inside of it, and a second operational position, wherein said cover leaves at least one portion of a length greater than 3 mm of said second portion of the end part of optical fibre completely uncovered, said at least one portion of said second portion of the end part of the optical fibre being provided with a bare end portion, said cover further comprising at least one opening for the passage of said second portion of the end part of optical fibre; and
- an elastic element interposed between said main body and said cover and such as to keep, in rest state, said cover in said first operational position, said at least one opening being of a size which is much larger than the transversal size of said second portion of the end part of optical fibre, so as not to interfere with said fibre during the movement of the cover between said first and second operational positions.

20. A method for manufacturing a connector for optical fibres, comprising the following steps:
- providing a main body adapted to hold a first portion of an end part of at least one optical fibre and to let a second portion of said end part of optical fibre project;
- providing a cover adapted to slide on said main body between a first operational position, wherein said cover houses said second portion of the end part of optical fibre inside of it, and a second operational position, wherein said cover leaves at least one portion of a length greater than 3 mm of said second portion of the end part of optical fibre completely uncovered, said at least one portion of said second portion of the end part of the optical fibre being provided with a bare end portion;
- providing an elastic element between said main body and said cover, said elastic element being such as to keep, in rest state, said cover in said first operational position; and
- providing in said cover at least one opening for the passage of fibre, said opening being of a size which is much larger than the size of said second portion of the end part of optical fibre, so as not to interfere with said fibre during the movement of the cover between said first and second operational positions.

21. A method for terminating a fibre-optic cable comprising at least one optical fibre with a central portion made of glass material and an outer coating made of acrylate, said cable further comprising at least one plastic tube housing said at least one optical fibre, a plurality of longitudinal Kevlar™ fibres arranged around said at least one plastic tube and a plastic outer sheath, comprising the steps of:
- providing at least one part of fibre of predetermined length by successively removing the plastic outer sheath, the longitudinal Kevlar™ fibres and said at least one plastic tube from a free end part of predetermined length of said cable;
- inserting said at least one part of fibre of predetermined length in at least one fibre housing channel formed in a main body of a connector for optical fibres so as to house a first portion of said part of fibre of predetermined length in said housing channel and to let a second portion of said part of fibre of predetermined length project, said connector for optical fibres further comprising a cover slidably associated with said main body and mobile between a first operational position, wherein said cover houses said second portion of the end part of optical fibre inside of it, and a second operational position, wherein said cover leaves at least one portion of a length greater than 3 mm of said second portion of the end part of optical fibre completely uncovered, said at least one portion of said second portion of the end part of the optical fibre being provided with a bare end portion, said cover comprising at least one opening for the passage of fibre, said opening being of a size which is much larger than the size of said second portion of the end part of optical fibre, so as not to interfere with said fibre during the movement of the cover between said first and second operational positions, said connector for optical fibres further comprising an elastic element operationally interposed between said main body and said cover and such as to keep, in rest state, said cover in said first operational position;

positioning a part of cable in an appropriate seat provided in the main body upstream of said fibre housing channel;

clamping said part of fibre of predetermined length with respect to said main body;

blocking said part of cable with respect to said main body;

moving said cover from said first to said second operational position so as to expose said end portion of predetermined length of said second portion of the end part of optical fibre; and cutting said end portion of predetermined length of said second portion of the end part of optical fibre at one of its cutting sections.

22. A fibre-optic communication line, comprising at least one cable including at least one optical fibre, said at least one cable being terminated at at least one of its free ends with a connector for optical fibres, comprising:

a main body adapted to hold a first portion of an end part of at least one optical fibre and to let a second portion of said end part of optical fibre project;

a cover slidably associated with said main body and mobile between a first operational position, wherein said cover houses said second portion of the end part of optical fibre inside of it, and a second operational position, wherein said cover leaves at least one portion of a length greater than 3 mm of said second portion of the end part of optical fibre completely uncovered, said at least one portion of said second portion of the end part of the optical fibre being provided with a bare end portion, said cover further comprising at least one opening for the passage of said second portion of the end part of optical fibre; and an elastic element interposed between said main body and said cover and such as to keep, in rest state, said cover in said first operational position, said at least one opening being of a size which is much larger than the transversal size of said second portion of the end part of optical fibre, so as not to interfere with said fibre during the movement of the cover between said first and second operational positions.

23. A distribution network comprising at least two distribution lines, each distribution line being a fibre-optic communication line comprising at least one cable including at least one optical fibre, said at least one cable being terminated at at least one of its free ends with a connector for optical fibres, comprising:

a main body adapted to hold a first portion of an end part of at least one optical fibre and to let a second portion of said end part of optical fibre project;

a cover slidably associated with said main body and mobile between a first operational position, wherein said cover houses said second portion of the end part of optical fibre inside of it, and a second operational position, wherein said cover leaves at least one portion of a length greater than 3 mm of said second portion of the end part of optical fibre completely uncovered, said at least one portion of said second portion of the end part of the optical fibre being provided with a bare end portion, said cover further comprising at least one opening for the passage of said second portion of the end part of optical fibre; and an elastic element interposed between said main body and said cover and such as to keep, in rest state, said cover in said first operational position, said at least one opening being of a size which is much larger than the transversal size of said second portion of the end part of optical fibre, so as not to interfere with said fibre during the movement of the cover between said first and second operational positions; and a branching unit associated with each of said distribution lines.

* * * * *